(12) United States Patent
Okehie

(10) Patent No.: US 8,774,295 B2
(45) Date of Patent: Jul. 8, 2014

(54) RECEIVER AND METHOD

(75) Inventor: Obioma Chiedozie Donald Okehie, Redhill (GB)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 12/852,749

(22) Filed: Aug. 9, 2010

(65) Prior Publication Data

US 2011/0069790 A1 Mar. 24, 2011

(30) Foreign Application Priority Data

Sep. 22, 2009 (GB) .................................. 0916648.9

(51) Int. Cl.
 *H04K 1/10* (2006.01)
(52) U.S. Cl.
 USPC .......................................... 375/260; 375/316
(58) Field of Classification Search
 USPC ........................... 375/260, 316, 284, 285, 350
 See application file for complete search history.

(56) References Cited

U.S. PATENT DOCUMENTS

| | | | |
|---|---|---|---|
| 7,388,922 B2 | 6/2008 | Yamagata | |
| 7,433,433 B2 | 10/2008 | Wilhelmsson et al. | |
| 7,746,970 B2 | 6/2010 | Mergen et al. | |
| 2005/0213679 A1 | 9/2005 | Yamagata | |
| 2006/0072692 A1 | 4/2006 | Gifford et al. | |
| 2007/0092015 A1 | 4/2007 | Hart et al. | |
| 2008/0152043 A1* | 6/2008 | Eun et al. ....................... | 375/340 |
| 2009/0046787 A1* | 2/2009 | Uesugi et al. ................. | 375/260 |
| 2009/0067520 A1 | 3/2009 | Gallizio et al. | |
| 2010/0315962 A1* | 12/2010 | Imai et al. ..................... | 370/252 |
| 2012/0069920 A1* | 3/2012 | Imamura et al. .............. | 375/259 |

FOREIGN PATENT DOCUMENTS

| EP | 1 030 488 A2 | 8/2000 |
|---|---|---|
| EP | 1 030 488 A3 | 8/2000 |
| EP | 1 580 948 A2 | 9/2005 |
| EP | 1 580 948 A3 | 9/2005 |

(Continued)

OTHER PUBLICATIONS

Partial Search Report issued Sep. 15, 2011 in Europe Application No. 10171736.1.

(Continued)

*Primary Examiner* — Emmanuel Bayard
(74) *Attorney, Agent, or Firm* — Oblon, Spivak, McClelland, Maier & Neustadt, L.L.P.

(57) ABSTRACT

A receiver detects and recovers data from Orthogonal Frequency Division Multiplexed (OFDM) symbols, which include pilot sub-carriers as well as data bearing sub-carriers. The receiver comprises a channel estimation processor and a channel estimate post processor. The channel estimation processor includes a pilot acquisition unit adapted to generate a sample of the channel transfer function for each pilot sub-carrier in a received OFDM symbol, and a channel estimator which is arranged to generate an estimate of the channel transfer function providing samples of the channel transfer function at each sub-carrier position in the received OFDM symbol from the pilot derived samples provided by the pilot acquisition unit. The channel estimate post processor is arranged to process the estimate of the channel transfer function received from the channel estimation processor to generate a processed version of the channel transfer function. The channel estimate post processor includes a controller, and a plurality of prediction filters. The controller is arranged to filter the estimate of the channel transfer function produced by the channel estimation processor using the plurality of prediction filters to form the processed version of the channel transfer function to effect of reducing noise in the processed version of the channel transfer function with respect to the estimate of the channel transfer function provided by the channel estimation processor.

23 Claims, 11 Drawing Sheets

Top Level block diagram of the Linear Extrapolator + CEPP alogorithm

(56) References Cited

FOREIGN PATENT DOCUMENTS

| JP | 2001-197032 | 7/2001 |
|---|---|---|
| JP | 2005-287043 | 10/2005 |
| JP | 2007-511942 | 5/2007 |
| JP | 2009-516484 | 4/2009 |
| WO | WO 2005/117377 A1 | 12/2005 |
| WO | WO 2008/129047 A1 | 10/2008 |

OTHER PUBLICATIONS

Kun-Chien Hung, et al., "Jointly Iterative Channel Estimation and Data Detection for Cyclic-Prefixed Block Transmission over Time-Varying Channels", International Conference on Information, Communications and Signal Processing, Dec. 10, 2007, XP031229620, pp. 1-5.

Jyh-Horng Wen, et al., "OFDM Channel Prediction Using Fuzzy Update LMS Algorithm in Time-Variant Mobile Channel", Vehicular Technology Conference, Sep. 1, 2006, XP031051412. pp. 1-5.

Dieter Schafhuber, et al., "MMSE and Adaptive Prediction of Time-Varying Channels for OFDM Systems", IEEE Transactions on Wireless Communications, vol. 4, No. 2, Mar. 1, 2005, pp. 593-602.

Extended European Search Report issued Jan. 11, 2012, in European Patent Application No. 10171736.1.

Japanese Office Action issued Dec. 3, 2013 in Japanese Patent Application No. 2010-212657, 3 pages (English translation only).

* cited by examiner

De-noising the ZOH data to achieve channel estimation

Top Level block diagram of the Linear Extrapolator + CEPP alogorithm

CEPP (Channel Estimate Post-Processing) Top level block diagram

ZOH imperfection in dynamic channel

Time-Dimensioned Linear Extrapolator operation

Time-dimensioned linear extrapolation with 1 P2 symbol

RECEIVER AND METHOD

FIELD OF THE INVENTION

The present invention relates to receivers and methods for detecting and recovering data from Orthogonal Frequency Division Multiplexed (OFDM) symbols, the OFDM symbols including a plurality of data bearing sub-carriers and a plurality of pilot bearing sub-carriers.

BACKGROUND OF THE INVENTION

There are many examples of radio communications systems in which data is communicated using Orthogonal Frequency Division Multiplexing (OFDM). Systems which have been arranged to operate in accordance with Digital Video Broadcasting (DVB) standards for example, use OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at the receiver, the OFDM symbol can include pilot sub-carriers, which communicate data-symbols known to the receiver. The pilot sub-carriers provide a phase and timing reference, which can be used to estimate a channel transfer function of a channel through which the OFDM symbol has passed, to facilitate detection and recovery of the data symbols at the receiver. In some examples, the OFDM symbols include both Continuous Pilot (CP) carriers which remain at the same relative frequency position in the OFDM symbol and Scattered Pilots (SP). The SPs change their relative position in the OFDM symbol between successive symbols, providing a facility for estimating the impulse response of the channel more accurately with reduced redundancy.

In order to reduce the effects of the channel through which the OFDM symbols have passed so that a receiver can detect and recover data to be communicated, it is necessary to generate an estimate of the channel transfer function at each of the sub-carrier positions in the OFDM symbol. Although scattered pilots and continuous pilots are provided in the OFDM symbols, in some examples it is preferable to be able to generate an estimate of the channel transfer function at each of the sub-carrier positions within the OFDM symbols, without having to store pilot symbols from previously received OFDM symbols, or having to wait until enough OFDM symbols have been received to provide a pilot at every sub-carrier position.

SUMMARY OF INVENTION

According to an aspect of the present invention there is provided a receiver for detecting and recovering data from Orthogonal Frequency Division Multiplexed (OFDM) symbols. The OFDM symbols include a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern. The receiver comprises a channel estimation processor and a channel estimate post processor. The channel estimation processor includes a pilot acquisition unit adapted to generate a sample of the channel transfer function for each pilot sub-carrier in a received OFDM symbol, and a channel estimator which is arranged to generate an estimate of the channel transfer function providing samples of the channel transfer function at each sub-carrier position in the received OFDM symbol from the pilot derived samples provided by the pilot acquisition unit. The channel estimate post processor is arranged in operation to process the estimate of the channel transfer function received from the channel estimation processor to generate a processed version of the channel transfer function. The channel estimate post processor includes a controller, and a plurality of prediction filters. The controller is arranged to filter the estimate of the channel transfer function produced by the channel estimation processor using the plurality of prediction filters to form the processed version of the channel transfer function to the effect of reducing noise in the processed version of the channel transfer function with respect to the estimate of the channel transfer function provided by the channel estimation processor.

Embodiments of the present invention provide a technique for generating an estimate of a transfer of function of a channel through which an OFDM symbol has passed by utilising the pilot sub-carrier signals disposed throughout the OFDM symbol. In particular, the estimate of the channel transfer function is achieved without performing interpolation/extrapolation in the time domain with respect to previously stored samples of the channel transfer function derived from previously received pilot sub-carriers. To this end, the channel estimation processor is provided with a channel estimator, which produces samples of the channel transfer function for each of the sub-carrier positions in the received OFDM symbol and a channel estimate post processor. The channel estimate post processor processes the estimate of the channel transfer function by as far as possible reducing the noise in the estimate, which may in part be caused by forming the estimate of the channel transfer function from samples derived just from a currently received OFDM symbol (intra OFDM symbol, on a symbol by symbol basis). More particularly, the channel estimate post processor includes a controller, and a plurality of prediction filters.

Embodiments of the present invention aim to provide a technique for generating a more accurate estimate of a channel transfer function with no or a reduced reliance on time direction interpolation/extrapolation of previously received pilot sub-carriers from earlier OFDM symbols. To this end, the plurality of prediction filters are used in combination to filter the samples of the estimate of the channel transfer function in the frequency dimension generated from the pilot sub-carriers of the currently received OFDM symbol. It has been observed that prediction filters can be effective for a predetermined number of samples after an initial period of convergence. After the predetermined effective period of operation, the prediction filters can diverge. That is to say, that is to say, the prediction filters produce an estimate of the channel transfer function with decreasing accuracy. Embodiments of the present invention therefore provide a channel estimate post processor which includes more than one prediction filter which is controlled by a controller.

In one example, the samples of the estimate of the channel transfer function may first be fed to a first prediction filter which is used to generate the estimate of the transfer function for a predetermined number of OFDM symbols. After a period pre-established by a simulation analysis, after which the prediction filter begins to diverge, the estimate of the channel transfer function is filtered by a second prediction filter, which is in a converged state. The first prediction filter is then re-set and used to filter the estimate of the channel transfer function with the effect that the first prediction filter can again be run in parallel, during initialisation phase, until the first prediction filter converges on an accurate estimate of the channel transfer function. At this point, the controller switches the output again to the first prediction filter to generate the estimate of the transfer function and the second prediction filter is then re-set, and the process is then repeated.

In another example two or more prediction filters may be connected in series, so that a first processed version of the channel transfer function may be filtered by a second of the prediction filters to form, at an output, a second processed version of the channel transfer function. As such, a bi-stage processing of the estimate of the channel transfer function may be formed. Such a bi-stage arrangement provides an advantage because there is a compromise between selecting a step size co-efficient $\mu$ for a prediction filter performing an extrapolation process with respect to the rate of change of the frequency response. As such, regardless of the step size value $\mu$, the extrapolation filter will be ineffective over a certain range of delay spreads. To address this problem, a cascade of extrapolation filters can be used to accommodate different possible types of multi-path channel and using different processing coefficients. Furthermore, the technique of using two prediction filters in parallel to obviate a problem with divergence can be combined with a plurality of stages, so that each stage has a plurality of prediction filters.

In another example the channel estimate post processor may include an averaging filter adapted to filter the processed version of the channel transfer function estimate provided at the output of the plurality of prediction filters, and a filter controller arranged to determine a relative measure of a rate of change of the channel transfer function by comparing the pilot sub-carriers at the same positions in successive OFDM symbols and to control the effect of the averaging filter in proportion to the rate of change of the channel transfer function. As such the averaging filter can be turned off or its effect reduced for channel transfer functions which have higher rates of change.

In some examples the channel estimator may include a linear extrapolator which is adapted to receive the pilot position samples of the channel transfer function provided by the pilot data bearing sub-carriers of the OFDM symbols and to generate the samples of the channel transfer function for each of the sub-carriers in the received OFDM symbol by performing a linear extrapolation of the samples derived from the pilot bearing sub-carriers in the frequency domain. The linear extrapolation can reduce a delay between forming the estimate of the channel transfer function and the channel transfer function through which the received OFDM symbols have passed.

The channel estimate post processor may also include a noise power estimator adapted to generate an estimate of noise power at each of the samples of the received OFDM symbol in the frequency domain by comparing the samples of the estimate of the channel transfer function with the corresponding samples of the processed channel transfer estimate. In some examples, in order to reduce edge effects, the noise power samples within a predetermined number of samples from each edge of the OFDM symbol in the frequency domain are generated by copying the samples corresponding to that predetermined number from other samples with the OFDM symbol.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the present invention will now be described with reference to the DVB T2 standard although it will be appreciated that the present invention is not limited to the DVB T2 standard but can be applied to other DVB standards such as DVB-H, DVB-T or DVB C2, or indeed other communication systems which utilise OFDM and distributed pilot sub-carriers within the OFDM symbols to generate an estimate of the general transfer function.

Figures 1, 2:
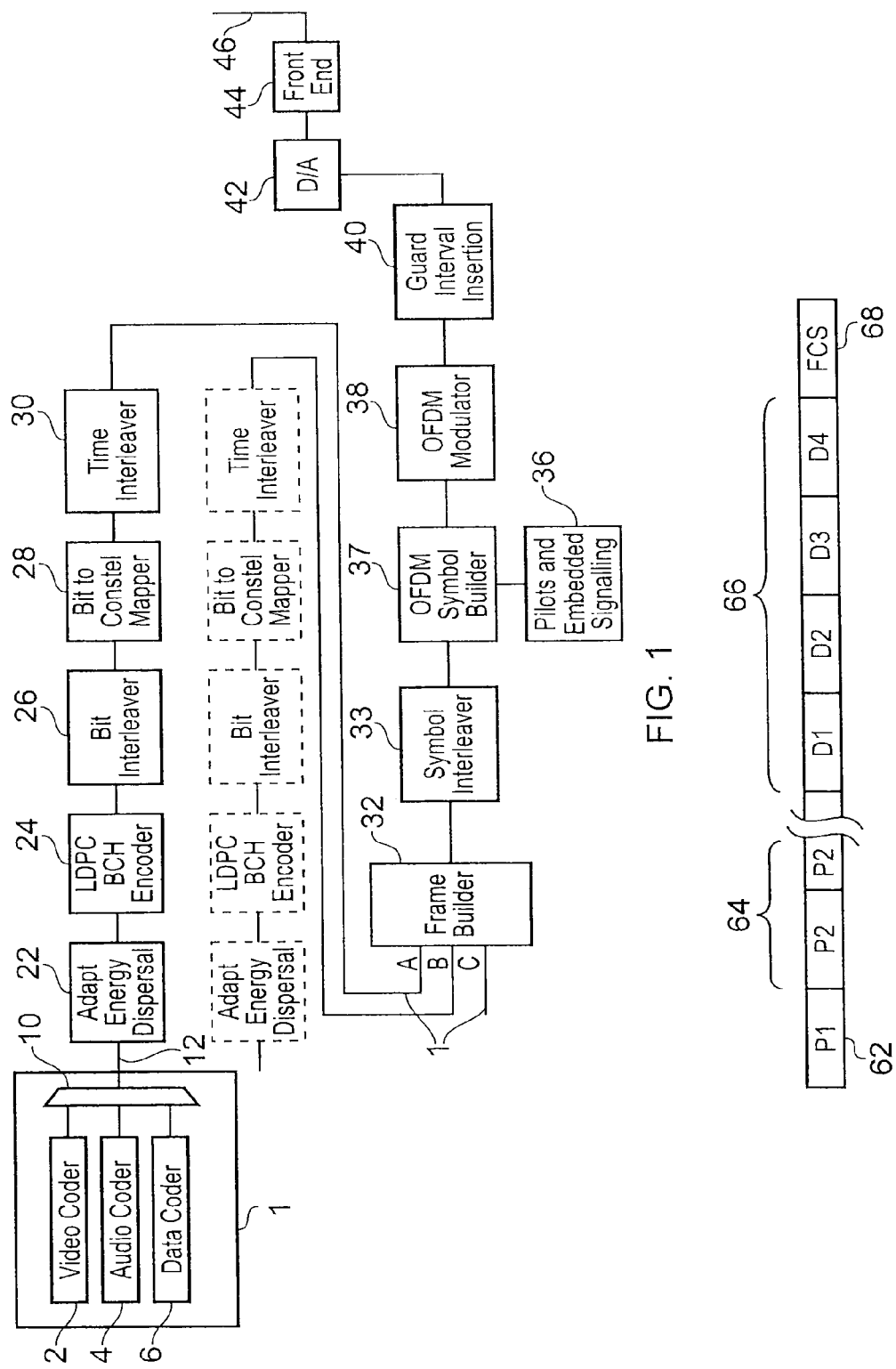
FIG. 1 provides a schematic diagram showing a typical DVB-T2 transmitter chain.
FIG. 2 provides a schematic diagram indicating a typical DVB-T2 frame structure.

FIG. 1 provides an example block diagram of an OFDM transmitter which may be used for example to transmit video images and audio signals in accordance with the DVB-T2 standard. In FIG. 1 a program source 1 generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1, an OFDM transmitter receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data OFDM symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B and C in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system, which may include one of 1 k, 2 k, 4 k, 8 k, 16 k or 32 k, each of which provides a different number of sub-carriers according, for example to the following table:

TABLE 1

Maximum Number of Sub-carriers per mode.

| Mode | Sub-carriers |
|------|--------------|
| 1K | 853 |
| 2K | 1705 |
| 4K | 3409 |
| 8K | 6913 |
| 16K | 13921 |
| 32K | 27841 |

The sequence of data cells to be carried in each OFDM symbol is then passed to the OFDM symbol interleaver 33. The OFDM symbol is then generated by an OFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between OFDM symbols, and then to a digital to analogue converter 42 and finally to an RF amplifier within an RF front end 44 for eventual broadcast by the OFDM transmitter from an antenna 46.

For the DVB-T2 system, the number of sub-carriers per OFDM symbol can vary depending upon the number of pilot and other reserved sub-carriers. An example illustration of a "super frame" according to the DVB-T2 standard is shown in FIG. 2.

Thus, in DVB-T2, unlike in DVB-T, the number of sub-carriers for carrying data is not fixed. Broadcasters can select one of the operating modes from 1 k, 2 k, 4 k, 8 k, 16 k, 32 k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 OFDM symbol as shown in FIG. 2, which provides signalling information relating to the configuration of the DVB-T2 deployment, including an indication of the mode. The P1 OFDM symbol is followed by one or more P2 OFDM symbols 64, which are then followed by a number payload carrying OFDM symbols 66. The end of the physical layer frame is marked by a frame closing OFDM symbols (FCS) 68 (however, this is only if mode is not a straight frequency interpolation only mode and is not a PP8 pilot pattern as will be described below). The DVB-T2 frame structure is discussed in more depth below. For each operating mode, the number of sub-carriers may be different for each type of OFDM symbol. Furthermore, the number of sub-carriers may vary for each according to whether bandwidth extension is selected, whether tone reservation is enabled and according to which pilot sub-carrier pattern has been selected.

Figure 3:
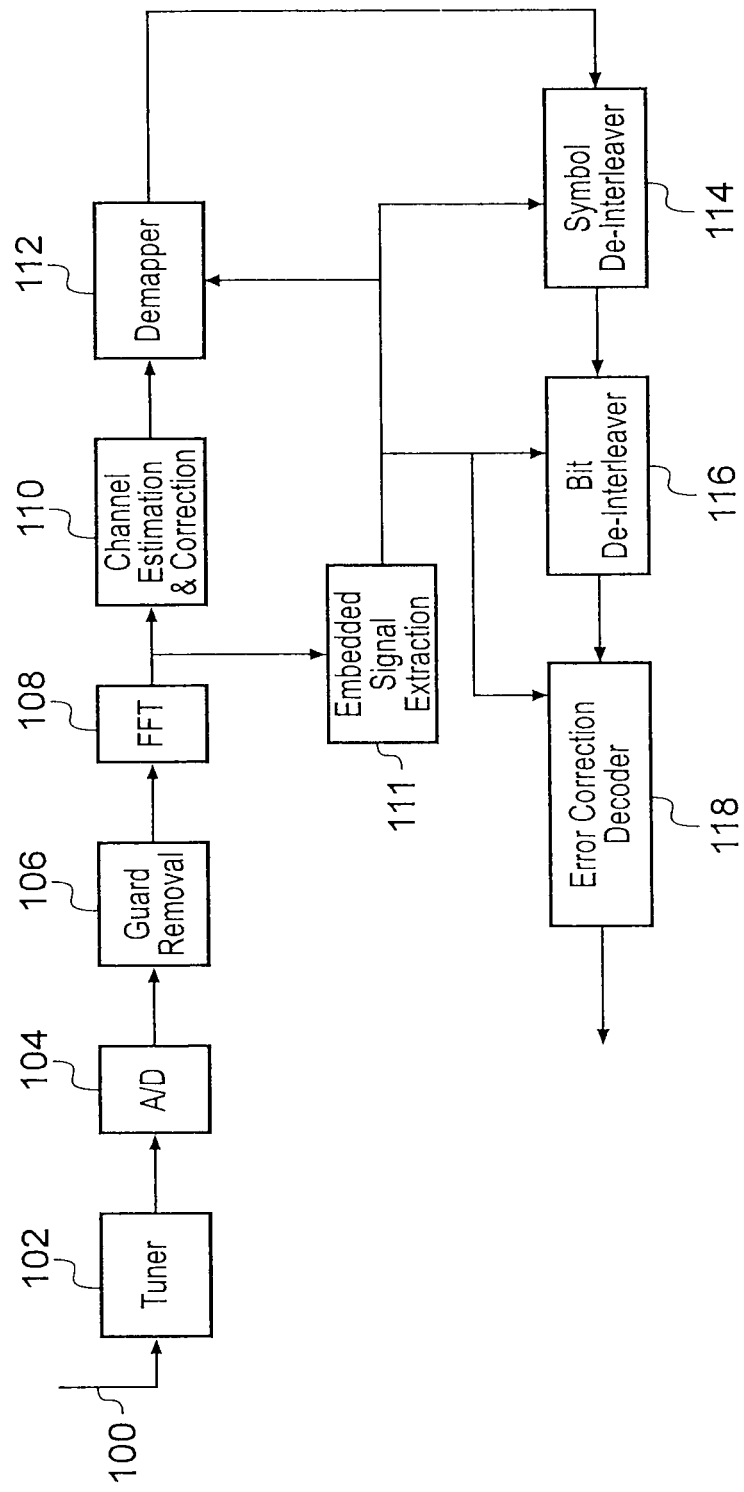
FIG. 3 is a schematic diagram showing a typical DVB-T2 receiver chain.

FIG. 3 provides an example illustration of a receiver which may be used with the present technique. As shown in FIG. 3, an OFDM signal is received by an antenna 100 and detected by a tuner 102 and converted into digital form by an analogue-to-digital converter 104. As discussed further below, in some embodiments the received OFDM may be a combination of two versions of the OFDM symbol transmitted by two separate groups of antennas. A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to an OFDM symbol de-interleaver 114, which operates to effect a reverse mapping of the received data OFDM symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

OFDM symbols can include pilot data which can be used at the receiver for synchronising and error correction. The pilot data is distributed across the sub-carriers of each OFDM symbol thus providing a number of pilot sub-carriers. Prior to transmission the pilot data is inserted on the pilot sub-carriers in each OFDM symbol at a boosted power level and at a known phase and amplitude. Therefore along with frame synchronisation and time synchronisation, the pilot data can be used by the receiver to estimate the channel response of the channel across which the OFDM symbol is transmitted. Once the receiver has an estimate of the channel response, the received OFDM symbols can be corrected to take account of the channel response. The pilot sub-carriers are typically distributed across the sub-carriers in each OFDM symbol and therefore variations in the channel response in both time and frequency can be estimated at the receiver. For example, for the DVB-T standard a single static pilot sub-carrier pattern is used, whereas in DVB-T2 there are eight pilot sub-carrier patterns (PP1 to PP8), each of which has been designed to work optimally with a particular FFT size and guard interval combination.

Figure 4:
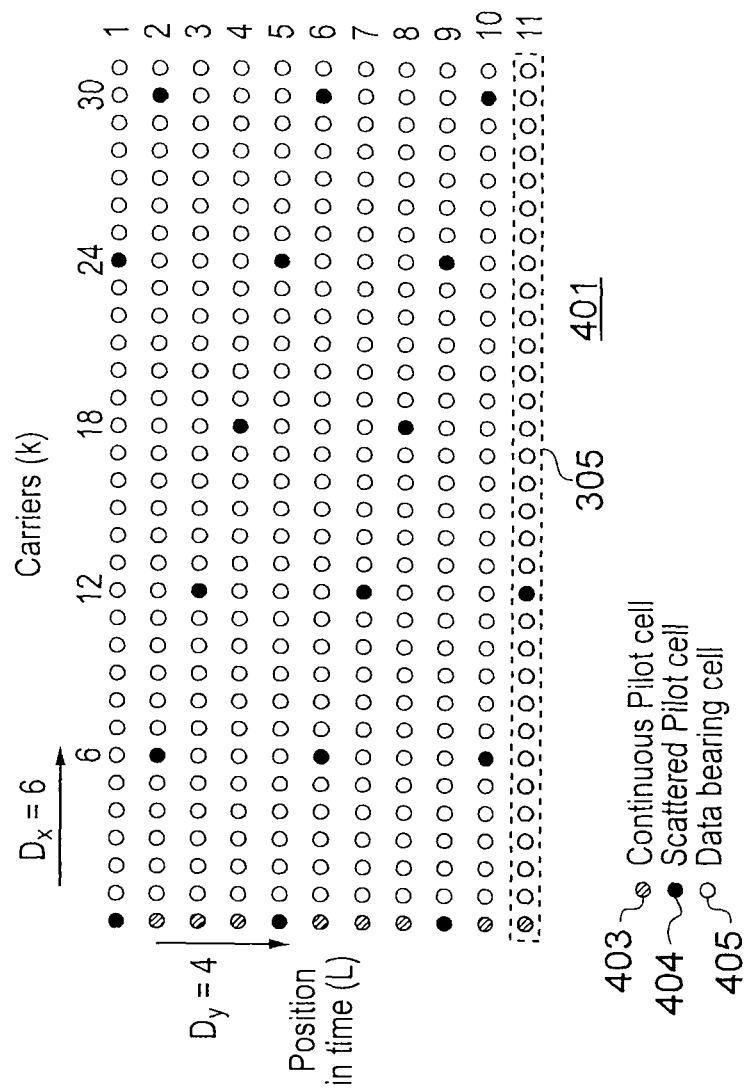
FIG. 4 provides a schematic diagram showing a generic OFDM symbol sequence.

FIG. 4 shows a first thirty two sub-carriers of a sequence of OFDM symbols transmitted over a period of time. The OFDM symbols form a two dimensional grid 401 with OFDM sub-carriers (k) shown along the horizontal axis and OFDM symbol position in time (L) along the vertical axis. Each individual circle represents the value of a particular sub-carrier on a particular OFDM symbol. These are referred to as cells. Each horizontal row of cells 305 represents the first thirty two sub-carriers of an OFDM symbol. As can be seen from the two dimensional array 401, the continual pilot sub-carriers 403 occupy the same cell in each OFDM symbol whereas the position of the scattered pilot sub-carriers 404 varies from OFDM symbol to OFDM symbol in a repeating cycle. The positions of the pilot sub-carriers are determined in accordance with the predefined pilot sub-carrier patterns discussed above. Each DVB-T2 pilot sub-carrier pattern is characterised by two values: Dx and Dy. Dx represents the spacing between scattered pilot sub-carriers on each OFDM symbol and Dy represents the number of OFDM symbols that separate OFDM symbols with scattered pilot sub-carriers in the same sub-carrier position. The OFDM symbol sequence shown in FIG. 4 shows the PP3 pilot sub-carrier pattern with Dx=6 and Dy=4. As illustrated in the FIG. 4 the OFDM symbols may carry continuous pilot cells 403 or scattered pilot cells 404 in between data bearing cells 405.

Improvements to Channel Estimation

Embodiments of the present technique provide an improvement in operations which are required to form an estimate a channel transfer function, through which the OFDM symbols have passed. In particular, the present technique has been conceived from a desire to perform channel and noise estimation on a frame by frame basis so as to comply more fully with the original intention of, for example, the DVB-T2 specification. Performing channel and noise estimation on a frame by frame basis will improve the performance of an OFDM communication system, because the system will be able to cope better with breaks in transmission of samples of the channel provided by pilot sub-carriers as a result, for example of long Future Extension Frames (FEF) frames. This is especially true in dynamic channel conditions. Estimation on a frame by frame basis will also improve the channel estimation acquisition times compared with techniques which require time-dimension channel estimation. In addition to generating an estimate of the channel transfer function from the samples of the channel transfer function provided by just the pilot sub-carriers from a received OFDM symbol, will also reduce hardware costs.

Embodiments of the present technique therefore seek to provide, as accurately as possible, an estimate of the channel without requiring significant memory or delay by storing previous pilot sub-carriers, which were transmitted at previous positions within the OFDM symbols. Therefore, the present technique aims to reduce a reliance on time direction extrapolation for generating an estimate of the channel transfer function, whilst being able to generate an estimate of the channel transfer function at each of the sub carrier symbols within the received OFDM symbol. So for example the OFDM symbol 305 should be provided with an estimate of the channel transfer function at each of the sub-carrier positions and preferably without reliance on pilot data derived from previous OFDM symbols at different sub-carrier positions.

Noisy Channel Estimation

Figure 5:
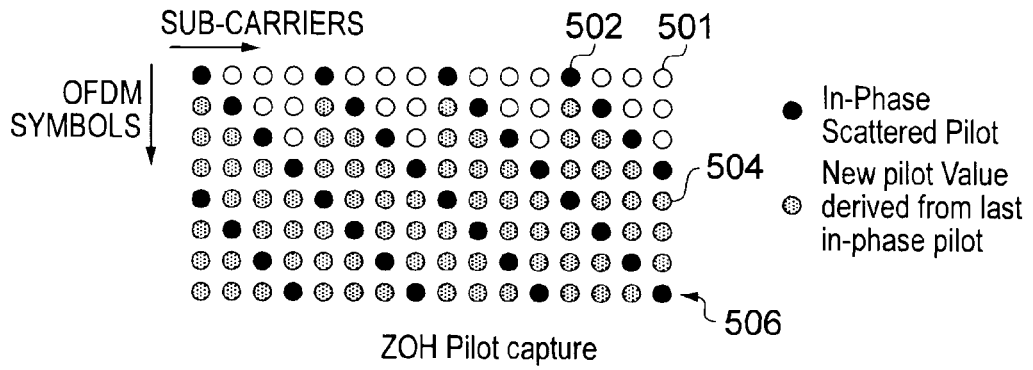
FIG. 5 provides a representation of pilot sub carrier signals for a plurality of OFDM symbols, which are processed to generate an estimate of the channel transfer function.
Figure 6:
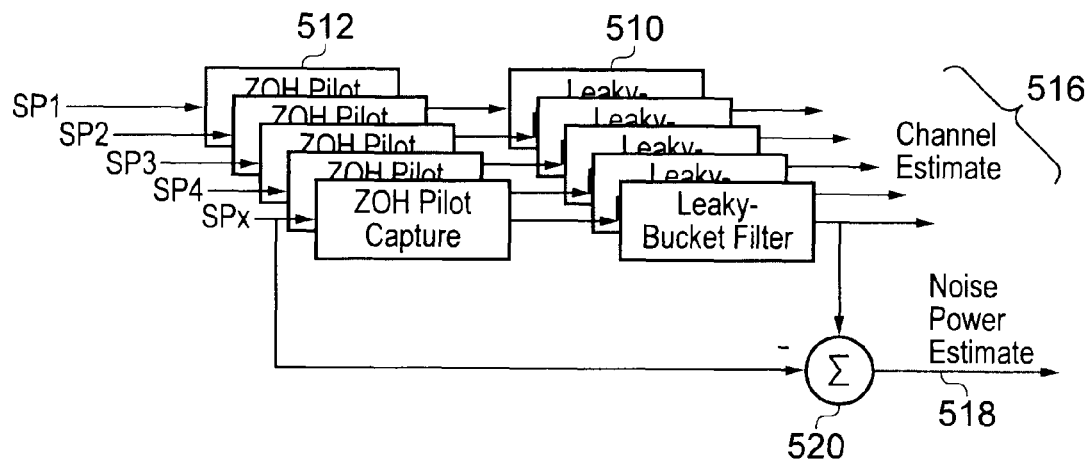
FIG. 6 is an example of a de-noising channel estimate post processor for a zero order hold operation.

One technique for generating intra-frame channel estimation for every OFDM symbol is a technique known as zero-order-hold channel estimation. Zero-order-hold channel estimation uses scattered pilots which are out of phase, derived from previously received OFDM symbols. FIGS. 5 and 6 provide an example illustration of a zero-order-hold channel estimation technique which generates an estimate of the channel transfer function at each of the sub-carrier positions using pilot sub-carrier data saved from previous OFDM symbols. As shown in FIG. 5 a diagram similar to that shown in FIG. 4 is provided for eight OFDM symbols having sixteen sub-carrier positions.

In FIG. 4 sub-carriers for carrying data 501 are shown as white or non-shaded whereas, sub-carriers carrying scattered pilot signals 502 are shown as black. By storing the pilot sub-carrier data from previous scattered pilot positions each subsequent OFDM symbol can be provided with an estimate of the channel transfer function at that position. Thus, eventually at the eighth OFDM symbol 506 each of the sub-carriers is provided with an estimate of the channel transfer function.

The problem with the zero-order-hold channel estimation technique is that it can result in noisy channel estimates with severely degraded noise power estimates, in both static and dynamic channels. In order to improve the channel estimate noise reduction techniques are provided according to example embodiments described below in order to make the zero-order-hold output useable. In a straightforward manner it is typical to use averaging filters to remove the noise from the channel estimates and in addition provide better noise power estimates. Such averaging filters may be in the form of a 'leaky-bucket' filter. Accordingly, as shown in FIG. 6 a leaky bucket filter 510 is provided to filter the pilot data captured by storing that pilot data from previous OFDM symbols as represented by a zero-order-hold pilot capture circuit 512. Thus, the zero-order-hold pilot capture processor 512 and a leaky bucket filter 510 are provided for each of the sub-carrier positions. At an output 514 there is provided for each of the sub-carriers an estimate of a channel transfer function represented collectively as channel estimate 516. Furthermore, in order to assist in later decoding of data conveyed by the OFDM symbols, a noise power estimate is generated at an output 518 using a subtracting unit 520, which compares the difference between the pilot sub carrier at the input of the zero-order-hold pilot capture circuit 512 and the leaky bucket filter 510.

Example Channel Estimator

Figure 7:
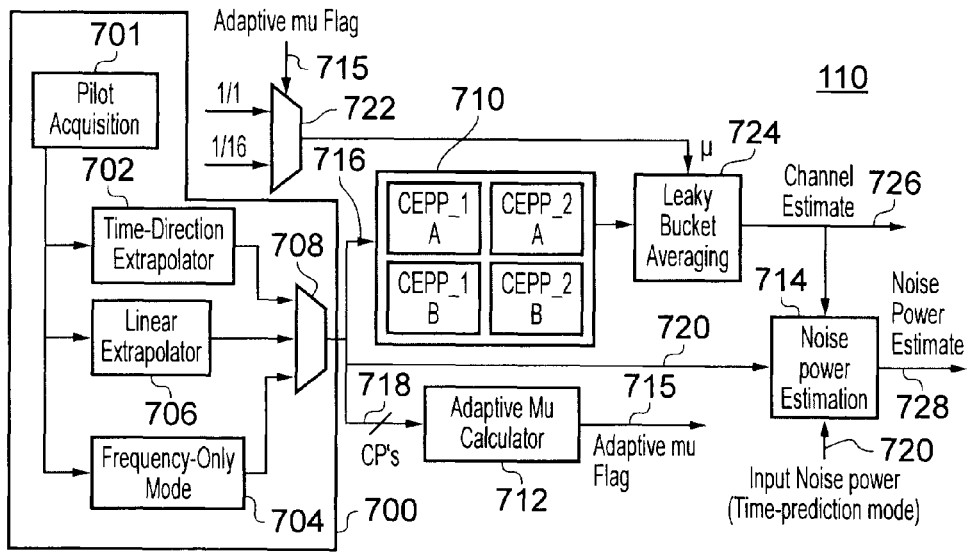
FIG. 7 is a schematic block diagram of a top level view of components which might form a channel estimator shown in FIG. 3 according to the present invention.

FIG. 7 provides an example illustration of a channel estimator 110 operating in accordance with the present technique. In FIG. 7 the channel estimator 110 includes a channel estimation processor 700 which includes a pilot acquisition unit 701 which is arranged to generate a sample of the channel transfer function for each pilot sub-carrier in a received OFDM symbol. The pilot acquisition unit 701 removes the samples of the channel transfer function generated by the pilot sub-carriers of the received OFDM symbols and feeds these samples to each of three extrapolator units 702, 704, 706, which can be selected in accordance with a mode of operation. The three extrapolator units 702, 704, 706 which are included within the channel estimation processor 700 include a time-direction extrapolator 702, a frequency only mode extrapolator 704 or a linear extrapolator 706, each of which forms a channel estimator. The channel estimation processor 700 is arranged to generate an estimate of the channel transfer function providing samples of the channel transfer function at each sub-carrier location in the OFDM symbol from the pilot position samples derived from the pilot sub-carriers by the pilot acquisition unit 701, which are formed at the output of a switching unit 708.

The channel estimator is formed by one or more of the extrapolators 702, 704, 706. The time-direction extrapolator 702 provides a time dimension extrapolation of the received data thus providing a future prediction of the samples of the channel transfer function based on previously received pilot sub-carriers. The frequency only mode interpolator 704 seeks to generate an estimate of a sample of the channel transfer function at each of the sub-carrier positions within the OFDM symbols using interpolation in the frequency dimension only. A further example of a channel estimator, which processes the pilot data extracted by the pilot acquisition unit 701 is a linear extrapolator 706, which will be described in more detail below. The linear extrapolator 706 is used to extrapolate between pilot generated samples of the channel transfer function without delaying the received signal. That is to say, the linear extrapolator 706 does not base its generation of the samples of the channel transfer function on previously received pilot data.

The output of the time direction extrapolator 702, the frequency only mode interpolator 704 and the linear extrapolator 706 is fed through the switching unit 708, which selects one of the outputs from the respective pilot data processors 702, 704, 706 and feeds these generated samples of the channel transfer function to a channel estimate post-processor 710 as well as an adaptive μ calculator 712 and a noise power estimation circuit 714 via respective connecting channels 716, 718, 720. The operation of the channel estimate post processor 710 will be explained shortly together with the adapted μ calculator 712. The adaptive μ calculator 712 is arranged in operation to provide a flag on an output channel 715 which is received by a further switch 722 to select one or other of a possible value for μ, which are 1/1 or 1/16. The value for μ is used by a leaky bucket averaging filter 724 for processing the output of the channel estimate processor before outputting on an output channel 726 an estimate of the channel transfer function.

The estimate of the channel transfer function is also fed to a further input of the noise power estimation circuit which 714, which generates an estimate of the noise power on a further output 728. The noise power estimation circuit 714 also receives on a further input 730 a noise estimate derived from a time prediction mode.

The channel estimator 110 shown in FIG. 7 utilises several techniques for improving an estimate of the channel transfer function which is derived from the samples of the channel transfer function derived from the pilot sub-carriers received from each of the OFDM symbols. These techniques will be described in turn in the following paragraphs. However, it will be appreciated that whilst these techniques are shown operating together in FIG. 7, they may each be applied independently and separately from the other techniques and it will be appreciated in that embodiments may include a channel estimator operating with one or more technique only. These techniques will now be explained.

Channel Estimate Post Processor

Figure 8:
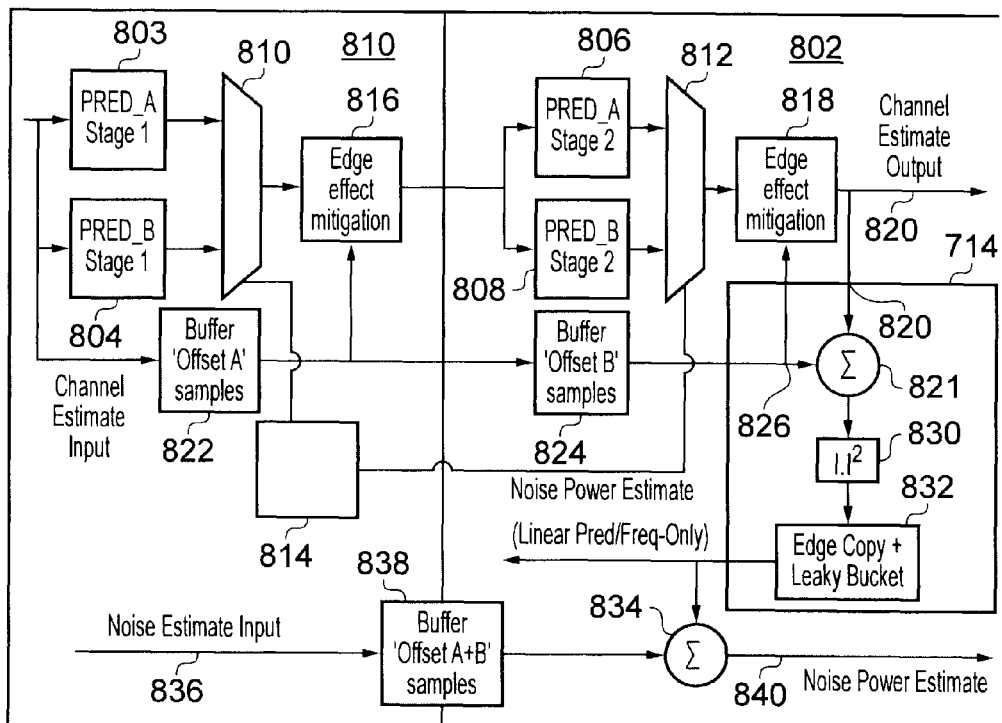
FIG. 8 is a schematic block diagram of a channel estimate post processor which is shown in FIG. 7.

An example of the channel estimate post processor which is shown in FIG. 7 will now be explained with reference to FIG. 8. FIG. 8 includes a bi-stage post processor of the estimate of the channel derived for example, from one of the extrapolators 702, 704, 706. A bi-stage channel post processor is formed by a first stage 801 and a second stage 802, each of which includes first and second prediction filters 803, 804, 806, 808 and a switch 810, 812 which is controlled by a controller 814. An output of the first stage 801 after passing through an edge effect mitigation circuit 816 is fed to a second stage 802. The second stage 802 also has an edge effect mitigation circuit 818 at the output of the switch 812 which feeds one of the outputs from either the first or the second prediction filters 806, 808 as present in the first stage 801. At the output of the edge effect mitigation unit 818 of the second stage 818 a channel estimate is provided, which has been processed using several techniques each of which will be explained in the following paragraphs.

Also shown in FIG. 8 is a first buffer 822 which delays samples corresponding to an amount equal to an offset of 'A' samples 822 and a second buffer 824 which introduces a buffer of offset 'B' samples. The output from the second buffer 824 for offset 'B' samples is provided to a second input 826 of a calculation circuit 821 from which is subtracted the channel estimate, which is provided on an output channel 820 from the second stage 800 to form an error signal. The error signal is fed to a further calculation circuit 830 which forms a squared magnitude of the error signal which is then combined with an edge copy and leaky bucket filter 832 to form at an output thereof a noise power estimation for a linear prediction or frequency only channel transfer function estimation techniques. An adder 824 combines the noise estimate provided at the output of the edge copy and leaky bucket circuit 832 with a noise power estimate received on a channel 836 which is buffered by a further buffer 838 by an amount of offset 'A' plus offset 'B' samples, so that when it is combined with the output from the edge and leaky bucket filter 832 it provides a total noise power estimate at an output 840.

The channel estimate post processing circuit 710 shown in FIG. 8 utilises a technique of prediction filtering of the channel estimate generated by, for example the linear extrapolator 806. Thus, as explained above the channel estimation post processor which forms part of the channel estimator 110 shown in FIG. 8 uses a combination of techniques which serve to improve the accuracy of the estimate of the channel transfer function generated from the pilot data received from the pilot sub-carriers of the OFDM symbols. In order to better understand these techniques they will each be explained in the following paragraphs.

Frequency Direction Channel Estimate De-noising

As identified above, although the zero-order-hold and leaky bucket filter technique shown in FIGS. 5 and 6 can provide an acceptable performance in static channels, in dynamic channels the operation of the time-dimensioned de-noising block (leaky-bucket filter) will 'smear' the channel estimate provided by the zero-order-hold block. This is because the filtering will average out some or all of the dynamic channel characteristics depending on the level of Doppler present in the channel. This in turn leads to poor channel estimation in dynamic channels. Embodiments of the present inventions therefore aim to remove as much of the noise as possible and at the same time preserve the channel characteristics of a dynamic channel.

One such technique involves using an adaptive filter dimensioned in the frequency axis. The use of a NLMS (Normalized Least Mean Square) extrapolation filter can serve to more accurately follow a dynamically changing channel and therefore more accurately estimate the channel from the samples of the transfer function provided by the available pilots. An example of one of the prediction filters 802, 804, 806 and 808 which appear in the channel post processor shown in FIG. 8 as the prediction filters is illustrated in more detail in FIG. 9.

Figure 9:
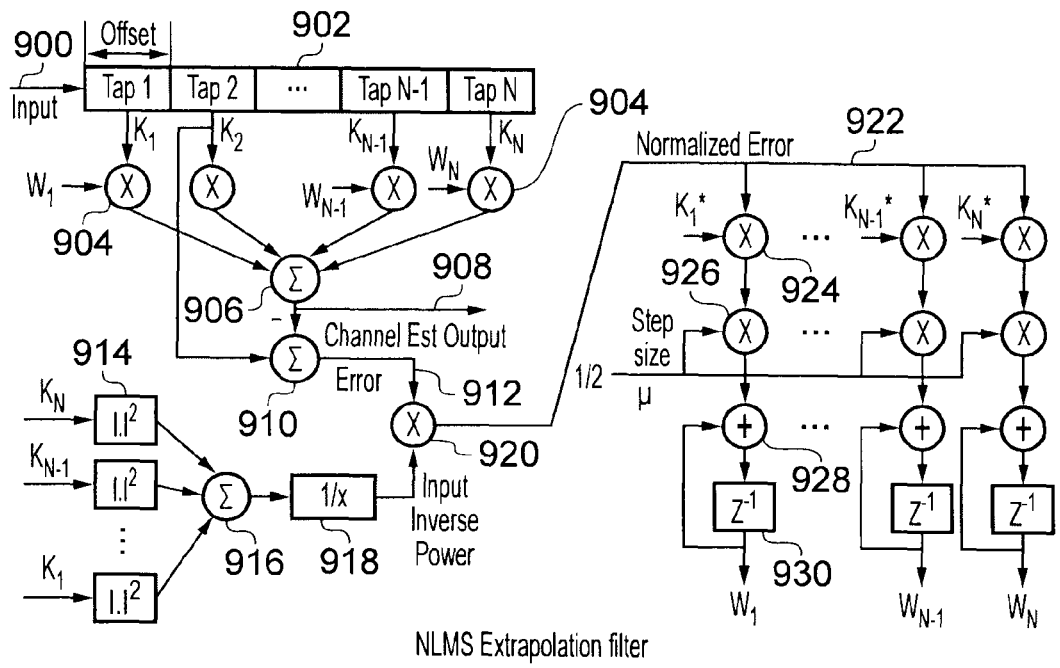
FIG. 9 is a schematic block diagram of a prediction filter which forms part of the channel estimate post processor shown in FIG. 8.

In FIG. 9 the extrapolated samples of the channel are received on a first input 900 into a shift register 902, which has N-taps. Each of the taps are multiplied by a weighting coefficient $w_i$, which is applied to a multiplier 904. An output of the each of the multipliers 904 is fed to a summing unit 906, which combines the respective outputs form each of the member circuits of the shift register 902 after multiplying it with the tap weights $w_i$ by the multipliers unit 904 to produce an estimate of the channel from the received samples. The estimate of the channel is provided on an output 908 and provides for each sub-carrier a sample of the channel transfer function.

According to the present technique two of the NLMS filters shown in FIG. 6 are used in tandem in order to provide a substantially continuous period in which the NLMS filters are operating in a converged state. This is because in a static channel, an extrapolator with a slow convergence (smaller step size) can remove more noise than one with a faster convergence rate (large step size) but at the expense of introducing unwanted start-up delays. With this in mind, it is possible to choose extrapolators with the primary emphasis focused on noise reduction. This means that at some point after convergence it can be expected that high quality estimates can be derived. The equation governing the de-correlation of noise from the wanted channel estimate is as follows:

$$W_{L+1,T} = W_{L,T} + \mu \left( K^*_{L,T} \frac{e_L}{\sum_T |K_{L,T}|^2} \right)$$

In this equation, which forms a basic NLMS equation, L is the sample number, T is the extrapolator tap number, $W_{L,T}$ is the tap coefficient for sample 'L', tap 'T', $K^*_{L,T}$ is the conjugate of the extrapolator input samples at each tap 'T', and $e_L$ is the error from the extrapolator for the sample 'L'.

This de-noising technique provided by the NLMS filter is dimensioned in the frequency axis which allows issues to do with convergence to be reduced because only the first few carriers of the first symbol will be affected. In contrast, the time-dimensioned approach will affect the first few symbols and hence result in a worse acquisition delay.

Using the Offset Parameter

As part of the NLMS technique described above, the tap weights $W_{L,T}$ are adapted in accordance with an error signal generated by comparing one of the samples from the shift register 902 with an output of the filtered channel estimate 908. To this end, a calculation unit 910 is arranged to subtract the samples at the output of the combiner 906 from the samples fed from one of the memory elements of the shift register 902 to form an error signal at an output 912. The error signal is then normalised by the magnitude of each of the samples of the received channel estimate held in the shift register 902, which is performed by an amplitude forming circuit 914 and an adder 916. The combined amplitude is then divided by the error signal by forming a reciprocal of that combined amplitude using a reciprocal forming circuit 918 and a combiner/multiplier 920.

The normalised error signal provided at an output of the combiner 920 is fed from an output channel 922 to each of a series of multipliers 924, which is scaled by the normalised error value with a conjugate of the complex samples held in each of the respective taps of the shift register 902. A further multiplier 926 is then used to scale the multiplied output from the multiplier 924 with a value μ. The μ scaled output value is then fed to an adder 928, which serves to add the present output value to one which has been delayed from a previous sample using a delay element which is fed back to the combiner 928, the delay element being shown at the output of the combiner 928 as delay element 930. At the output of the chain is formed for each tap of the shift register 902 the waiting value $W_{L,T}$ which is then used in the combiners 904 to effectively remove the noise from the channel estimate by using a prediction filter on the extrapolated samples derived from a pilot state to form the channel estimate at the output 908. Thus, the prediction filter shown in FIG. 9 implements the equation presented above to form a normalised least mean square error filtering technique. Effectively, this serves to de-correlate noise from the input channel estimate to form the output or processed channel estimate.

As will be appreciated, because the error signal is formed from one of the taps to the shift register 902, then there is a delay between the sample of the channel estimate which has been de-noised at the output of the prediction filter and that provided at the input of the prediction filter. Accordingly, a shift is required at the output of the channel estimator in order to take this offset into account. For this reason the offset buffers 822, 824, 838 are present in the channel estimate post processor 710, which are shown in FIG. 8. The effect is illustrated in FIG. 10.

Figure 10:
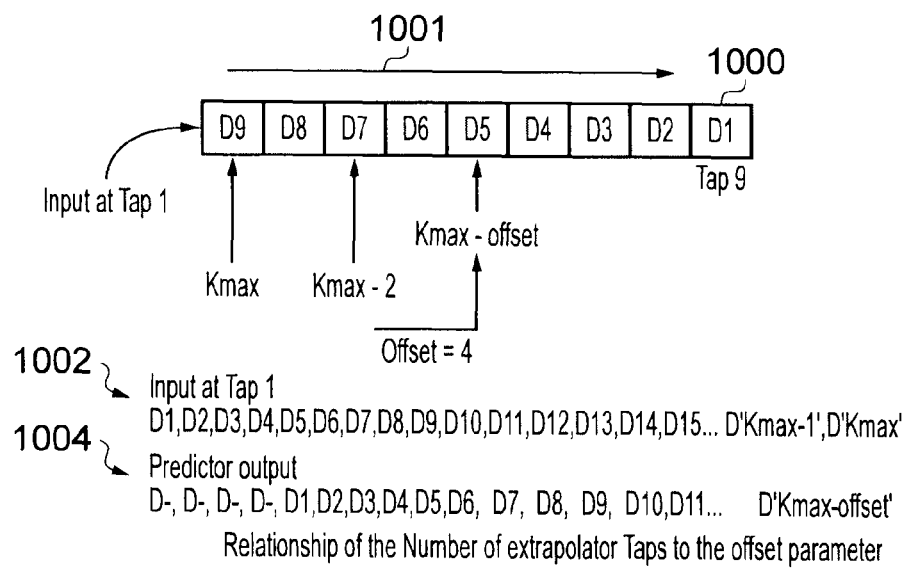
FIG. 10 is part schematic, part flow diagram representation of the operation of the extrapolating filter shown in FIG. 9.

In FIGS. 9 and 10 the 'offset' parameter denotes the point at which the error is generated from, and is usually the 'offset+1' numbered register in the input data chain/FIFO. In FIG. 9 above the offset parameter is set to '1' and so the error is calculated from tap number 2. So in effect the output of the extrapolator is the cleaned up estimate for the noisy estimate currently in the extrapolator memory at the tap position specified by the 'offset+1' parameter. As indicated above, one consequence of the offset parameter is that quality extrapolation will not be available for an 'offset' number of samples at the end of a symbol, for example when the last carrier 'Kmax' (where Kmax is the number of carriers per symbol) is entered into the extrapolator memory, the actual position for the estimate at the output will be for carrier 'Kmax-offset', and so there is no more data left to obtain clean estimates for the last 'offset' number of carriers. In addition, a re-alignment is required between the output data and the input data, because clocking is stopped at carrier 'Kmax'. This is illustrated in the FIG. 10, assuming that the number of extrapolator taps is 9.

FIG. 10 illustrates a process in which a nine tap shift register 1000 receives samples of the channel which are fed in a direction illustrated by an arrow 1001 with respect to the numbering of the shift registers Dn where n is equal to 1 to 9. If the offset value is equal to 4, that is to say the error signal is generated from the tap with the delay D5, then a corresponding offset in the output of the channel estimate will be required of 'Kmax–offset' where Kmax is equal to the sample in shift register element D9. Thus, with an input at tap 1 illustrated by the sequence 1002, the prediction output is as shown in sequence 1004 which shows a delay of 'offset=4' samples before the offset is available after which there is a delay between the input and the output of 'Kmax-offset' samples.

Currently, the gap at the end of the predicted symbol is filled by copying from the values of the original input samples. This is known as edge effect mitigation and is performed by the edge effect mitigation circuits 816, 818 as shown in FIG. 8, and will be explained in more detail later.

NMLS Extrapolated Divergence

The NLMS extrapolator represented in FIG. 9 is a closed loop system and hence employs the use of a feedback mechanism to de-correlate the noise from the signal. The error normalization feature helps to reduce the divergence of the tap coefficients. However this reduction is not always sufficient and is dependent on the step-size ($\mu$ factor) and the number of samples that have to be processed before the filter is reset. This means that for a given number of taps and step-size parameter, an NLMS extrapolator will lose its capability to de-correlate the noise from the signal after a given number of samples.

Figure 11:
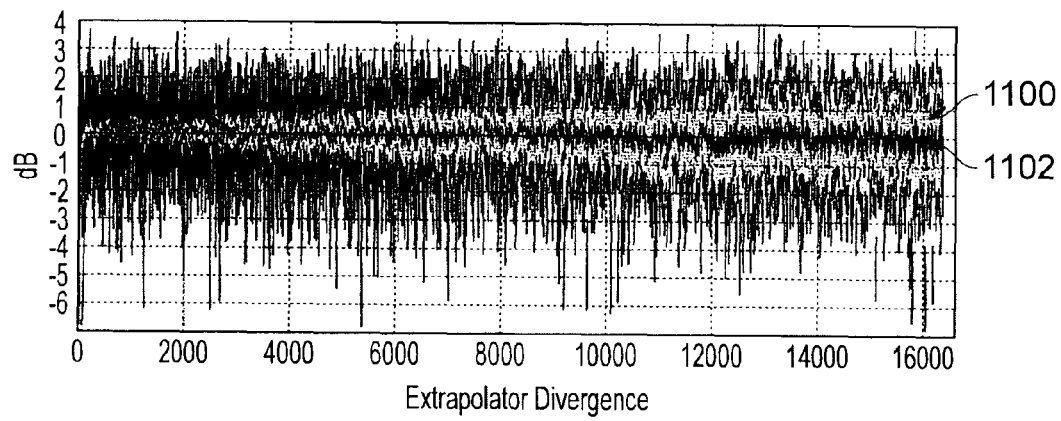
FIG. 11 is a graphical representation of the effect of convergence and divergence of the prediction filters shown in FIG. 9.

To illustrate this effect, an example graphical representation of a plot of output signal sample values is provided in FIG. 11 of two NLMS extrapolators each having thirty six register taps. For the first NLMS extrapolator a step size factor $\mu$ of '1/16' is used to produce output samples 1100 and for the second NLMS extrapolator producing samples 1102 a step-size factor of $\mu$'1/100'. Both examples are run for a set number of samples having passed through their inputs. As can be seen from FIG. 11, the extrapolator with the larger step-size $\mu$ 1100 of 1/16 converges faster but suffers from divergence more quickly than the extrapolator with the smaller step-size 1102 of 1/100. It can be deduced from this that irrespective of the parameters of the NLMS extrapolator, they will eventually diverge, some taking longer than others due to their step sizes, number of taps, etc. Various methods can be used to reduce the divergence of the extrapolator. One method used in previous designs is to 'leak' away the tap coefficient factor $W_{L,T}$ to reduce the effect of divergence, but this does not totally remove the divergence.

Thus, in effect the extrapolation filters will operate correctly for a predetermined number of samples after an initialisation period before they begin to diverge. Furthermore, it is desirable to form a prediction filter which can allow the step size to be selected in accordance with predetermined criteria, for example, as will be explained later the rate at which the channel is changing will require a larger $\mu$ value in order to allow the filter to converge more quickly.

According to the present technique to avoid the effect of divergence two extrapolators are used in tandem. This technique works on the principle that if it is known by evaluation that an extrapolator will diverge after a predetermined number of samples, then it is possible to reset the extrapolator before this divergence occurs, and so, while one extrapolator is in its reset and pre-convergence state the other extrapolator is providing valid data at it output. The channel estimate post-processor 710 shown in FIG. 8 therefore includes in each stage a pair of extrapolator filters 802, 804, 806, 808 for each of the two stages 801, 802. This is illustrated in the FIG. 12.

Figure 12:
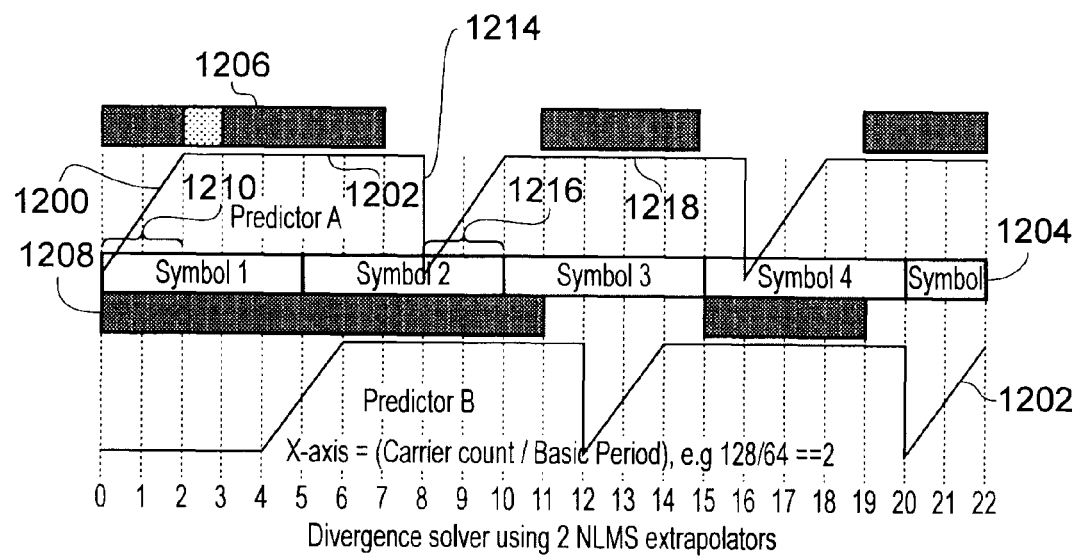
FIG. 12 is a graphical illustration of the operation of a pair of first and second prediction filters so that one of the prediction filters is used at an optimum processing point in accordance with an embodiment of the present invention.

As can be seen in FIG. 12 the operation of a first prediction filter is graphically represented by a line 1200 and the operation of the second prediction filter is graphically represented by a lower line 1202. In FIG. 12, the x-axis represents a given number of samples, hereby termed 'basic period'. The algorithm works by first choosing parameters for the NLMS extrapolator that will allow for a convergence time that is less than '2× Basic period' number of samples and a valid operating range of '6× basic period' samples, or alternatively the basic period can be chosen to match the extrapolator parameters instead. It should be noted that a wide range of convergence and valid period ranges can be used and so the numbers given above are in no way exhaustive.

One caveat to do with the operation of the algorithm is that after reset and for a maximum of the first '3× basic period' samples, the output data will not represent the true channel estimate, the actual number of samples will depend on the step-size and the number of taps employed in the extrapolator. In any case, because this algorithm is frequency dimensioned and being used in an OFDM system, it will perform much better than a time-dimensioned estimator because there would at least be a channel estimate during the first symbol.

Also in FIG. 12, boxes 1204, represent symbols as they are processed by the prediction filter. That is to say, the pilot data from each of those symbols is processed in turn. Solid boxes 1206 and 1208 illustrate periods in which the prediction filters are respectively operating in their optimum performance. As can be seen from the upper line 1200, after an initialisation period 1210 the prediction filter operates with a corresponding convergence between the input and the output with a flat line 1202. After a set number of symbols or samples, the prediction filter is re-set as illustrated by a vertical line 1214. The prediction filter then begins to converge during a second convergence period 1216 for a further converged period 1218. As can be seen from the lower line 1202 the second prediction filter is arranged to operate in an opposite phase so that at least some part of the converged horizontal line performance on each of the filters is available for outputting the channel estimates. Accordingly, the controller arranges for each of the prediction filters to operate in tandem so that at least one of those prediction filters is operating in a converged state, at any point in time, which can therefore be used to generate the output of the channel estimate. This is achieved by operating the switch 800, 812 shown in FIG. 8.

Multi-Path Delay-Spread Considerations

In multi path channels having short relative delays between a main path and an echo path a resulting channel response will exhibit frequency dimensioned selectivity with low gradients of change. The opposite can be said about multi-path channels with long relative delays, in this case the frequency selectivity will have steeper gradients due to the increase in the number of channel nulls or attenuations and channel amplification. An example of frequency selective fading is illustrated in FIG. 13.

Figure 13:
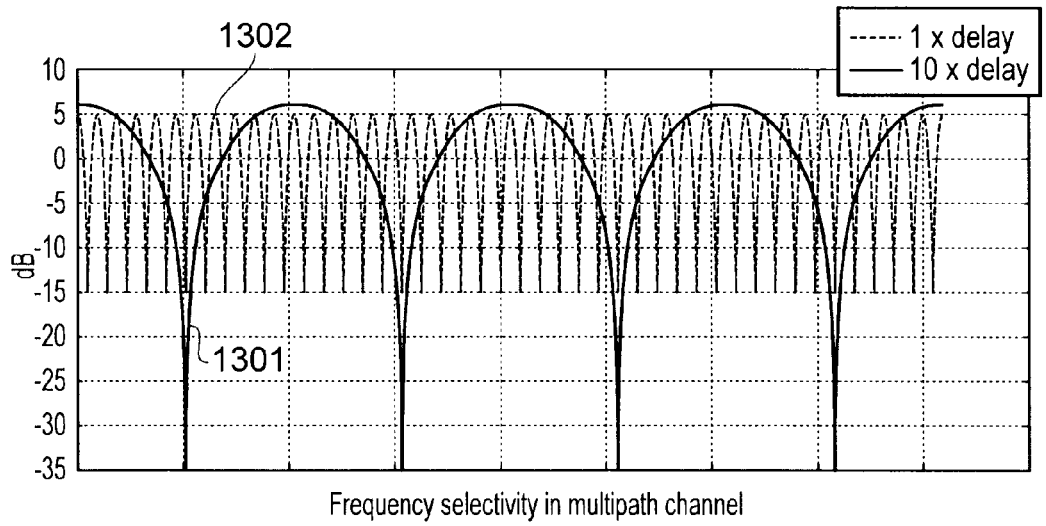
FIG. 13 a graphical plot illustrating a variation of selective fading in the frequency domain in the a multi-path channel for a static and dynamic channel.

FIG. 13 provides a plot of amplitude against frequency for two example channels. A first channel illustrated by a line 1301 corresponds to a frequency response for a multi-path channel, which has a relatively short delay between a main path and an echo path. In contrast a second plot 1302 illustrates a frequency response for a multi-path channel with a relatively long delay between a main path and an echo path. Accordingly, the second plot 1302 provides steeper gradients between frequency nulls which increase in number as a result of the long multi-path delay spread.

Figure 14:
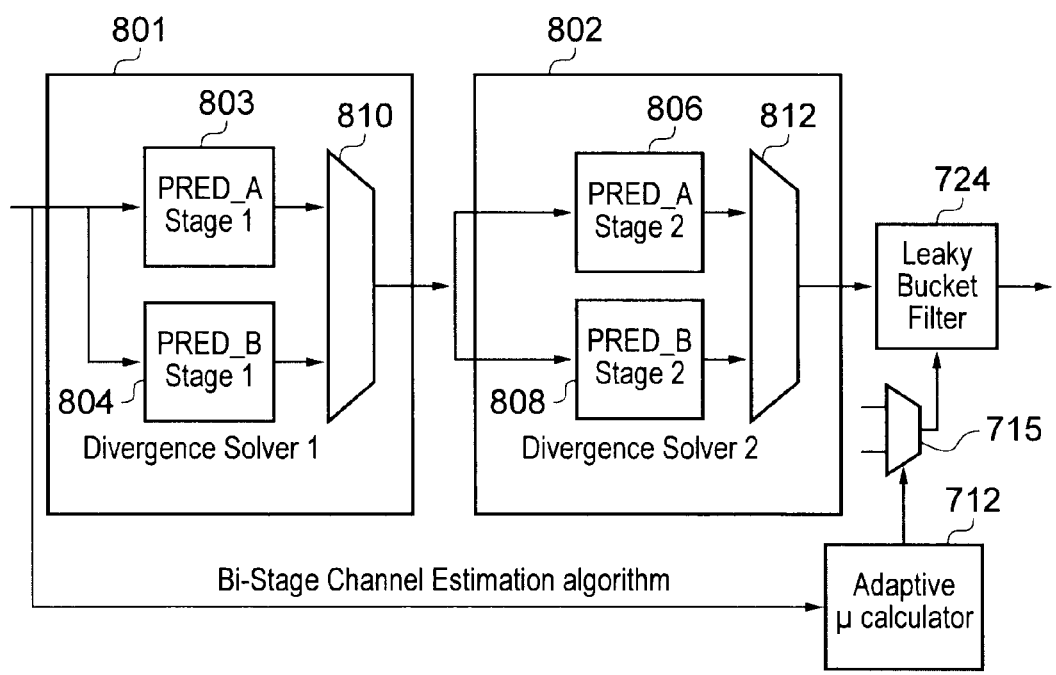
FIG. 14 is a schematic block diagram of a bi-stage channel estimation technique which is used by the channel estimate post processor shown in FIG. 8.

Accordingly, there is a compromise between selecting a step size co-efficient $\mu$ for the extrapolation filter with respect to the rate of change of the frequency response. As such, regardless of the step size value $\mu$, the extrapolation filter will be ineffective over a certain range of delay spreads. To address this problem, a cascade of extrapolators is used as illustrated in FIG. 14, which have been isolated from the example shown in FIG. 8. FIG. 14 illustrates a bi-stage arrangement according to one aspect of the present technique, in which the channel estimate post processor is formed of two sections of a two stage process. According to embodiments of the present invention the two stage process is used to sequentially process the channel estimates in order to accommodate different possible types of multi-path channel.

In FIG. 14, a first stage extrapolation filter 801 provides a pair of parallel extrapolation filters which operates as explained above in tandem, to ensure that one of those filters is operating in a converged state. Accordingly, as explained above a switch 810 is used to switch the output from one of the extrapolation filters which is currently being selected to form the output channel estimate. A corresponding arrangement is provided in a second stage 802. The multi-path channel can have relatively long delays between a main path and an echo path and relatively short delays between a main path and an echo path. Accordingly, and since processing is being performed in the frequency domain, the variation in types of multi-path will effect the frequency selective fading in the frequency domain.

The use of an extrapolator having a large step-size coefficient in a channel with short delay-spread will not be able to remove as much noise when compared to an extrapolator having a smaller step size, but it will maintain the shape of the channel. Likewise, the use of an extrapolator with a small step size coefficient in a channel with long delay-spreads may result in a 'smearing' or over filtering of the channel response. This is because the pass-band of the adaptive filtering process may be too small for the signal at its input. This is particularly critical as the extrapolator is intended to be used on the frequency dimension axis, in other words, if a single extrapolator is to be used in the frequency axis then there will exist a range of delay-spreads where the noise removal process will be ineffective, and this will be irrespective of the step-size coefficient being used.

So, in order to solve this problem, it is possible to use the characteristics of the extrapolator performance to an advantage. By making use of the fact that larger step-sizes can preserve the 'shape' of the channel then it is possible to employ the use of a cascade of extrapolators (two in this case, having large step-sizes). The function of the first stage will be to remove some noise from the input signal and at the same time preserving the shape of the true channel estimate. It should be noted that at this stage the output will be rather noisy and possibly not useable depending on the level of noise in the system.

The second stage is then intended to remove most of the remainder of the noise from the output of the first stage while preserving the shape of the channel from the first stage. This arrangement is similar to that of cascaded FIR filtering in order to maintain good filtering at minimal costs for interpolation functions etc. It should be noted that both stages make use of extrapolators with large step-sizes so that smearing of the channel estimate is avoided while at the same time removing as much noise as is possible.

Using such a technique allows for the adequate removal of noise in channel estimates for channels with multi-path delays up to the guard interval of the OFDM symbol and beyond.

Static vs Dynamic Channel Operation

As shown in FIGS. 7 and 14 at an output of the channel estimation prediction filters 801, 802 a leaky bucket filter 724 is provided in order to provide some time based filter in static channels to remove any residual noise left in the channel estimate after frequency axis extrapolation. The operation of the leaky bucket filter is controlled by a controller 712, which switches a step-size of the leaky bucket filter between 1 and $1/16$, in accordance with whether the channel is dynamic or static respectively.

In static channels, the use of a time-based filtering approach results in better channel estimates, because this operation removes any residual noise left in the channel estimates after frequency-axis extrapolation. The most common filtering approach is the use of the leaky bucket filter. In order to preserve the instant acquisition property of the frequency-axis extrapolation, it is best to place such a time-based filter at the output of the extrapolator. Doing this ensures that reasonable channel estimates are always available and these estimates get better in the time dimension due to the filtering process. However, as discussed earlier, the use of a time-based filter in such a direct manner will compromise the quality of the channel estimates in a dynamic channel situation. It is therefore desirable to preserve the use of the time-based filtering for static channels. This being the case, the only other option available is to switch off this filtering approach in a dynamic channel, consequently the need for a grading process of how dynamic a channel may be is now required, which is explained in the following section.

However, using such a time based filter in a direct manner may compromise the quality of the channel estimates where the channel is changing. However, it is important to use time based filtering in static channels. Accordingly, a scaling factor provided with the leaky bucket filter is adapted in accordance with the dynamic state of the channel.

Adaptive μ Calculator

In an OFDM transmission, continuous pilots are present on every symbol and always occur on the same carrier location, by monitoring the gradient of amplitude change for a group of these carriers, it is possible to grade the level of dynamicity present in a channel.

Figure 15:
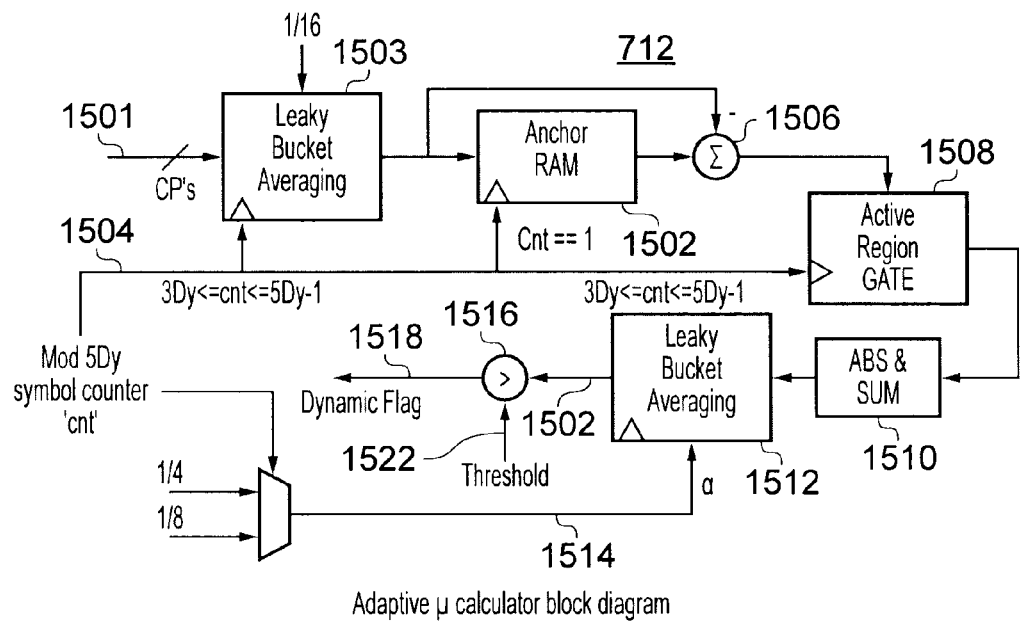
FIG. 15 is a schematic block diagram of an adaptive $\mu$ calculator which forms part of the channel estimator shown in FIG. 7.

FIG. 15 provides an example of the adaptive μ calculator 712 which serves to select a value of μ which effectively turns off the leaky bucket filter for dynamic channels. In FIG. 15 a leaky bucket averaging filter 1503 is shown to receive continuous pilot values at an input 1501. An output of the leaky bucket filter 724 is fed to an anchor RAM unit 1502 which serves to delay the output under control of a control signal fed on an input 1504. The output from the anchor RAM 1502 is fed to the subtraction circuit 1506 which subtracts the output from the anchor RAM 1502 from an output of the leaky bucket averaging filter 1724. An output from the subtraction unit 1506, is fed to an active region gate 1508, which also receives a count value from a control unit 814 (not shown in FIG. 15). The control input 1504 provides a count of the symbol values for the OFDM symbols and provides a modulo 5×Dy symbol counter, to count in the presence of pilot carriers on successive OFDM symbols separated by Dy symbols. An output of the active region date unit 1508 is fed to an absolute sum calculator 1510. The output of the absolute and sum calculator 1510 feeds to a leaky bucket averaging filter 1512. The leaky bucket averaging filter 1512 is arranged to receive a control input which provides a variable a 1514. An output of the leaky bucket filter 1512 feeds a signal processing circuit 1516, which converts the analogue output of the leaky bucket filter to a binary flag value at an output 1518, by comparing the output of the leaky bucket filter 1520 with a threshold value 1522. Thus, if the output of the leaky bucket averaging filter 1512 is above a threshold fed on the channel 1522, then a flag at the output 1518 is raised and this is used to switch off the leaky bucket averaging filter at the output of the channel estimate processor 710.

The technique used by the apparatus of FIG. 15 makes use of a modulo 5×Dy symbol counter at the heart of its operation. The intention is to gauge the average difference in pilot amplitudes over a range of specified symbols. The difference should be minimal in static channels and noticeable in dynamic channels, due to the use of the filter at the start of the process.

Figure 16:
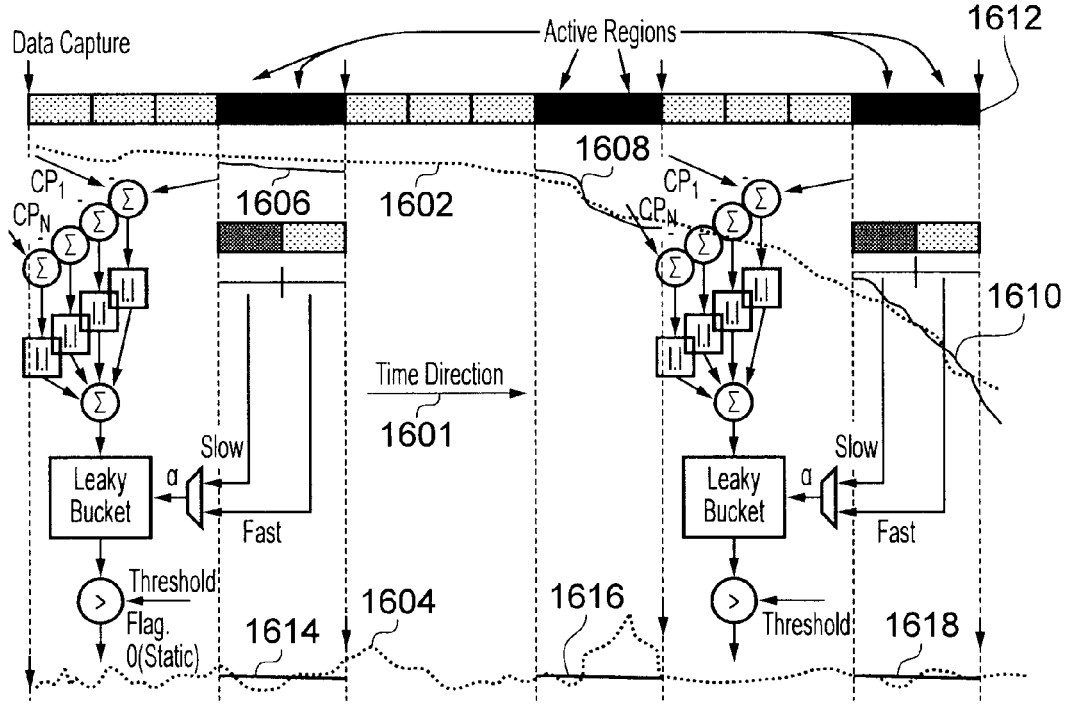
FIG. 16 is a part schematic part flow diagram representation illustrating the operation of the adaptive $\mu$ calculator shown in FIG. 15.

The operation of the adapted μ calculator shown in FIG. 15 is illustrated in a schematic from in FIG. 16. FIG. 16 provides a conceptual representation of the operation of the adaptive μ calculation shown in FIG. 15. In FIG. 16 a graphical representation of channel values with respect to time as illustrated by an arrow 1601. Thus an upper plot 1602 represents a plot of a dynamic channel and a lower plot 1604 illustrates the presence of a static channel. Solid lines 1606, 1608 and 1610 illustrate regions where the adapted μ calculator shown in FIG. 15 is active by processing continuous pilots using the continuous pilots captured from the OFDM symbols as illustrated by the boxes 1612. Correspondingly, the solid lines with respect to the lower dotted lines 1604 illustrate regions in which the adapted μ calculator is active and these correspond to symbols which include continuous pilots, which can be used by the adapted μ calculator to determine whether the channel is static or dynamic. These solid regions 1614, 1616 and 1618 therefore illustrate regions where the continuous pilots are processed to determine whether the channel is static or dynamic.

There are two important periods of operation, the first is the data capture symbol time and the second is the active difference calculation region. The data capture symbol is defined as the symbol in which the counter value is 1 and the active region is defined as symbols over which the counter is within the range '3×Dy' to '5×Dy−1'.

The averaging process is only initiated during the active region, and so by subtracting the data during the captured symbol from the range of data over the active region an amplitude gradient can be determined. A further filtering of the consolidated gradient provides a more static reference value for threshold comparison. This further filtering process involves the use of a time multiplexed filter coefficient, this coefficient performs narrower band filtering during symbols over which the counter is in the range of 3×Dy to 4×Dy and performs a wider band filtering during symbols over which the counter is in the range of '4×Dy+1' to '5×Dy−1'. This is done to balance out the results obtained because the gradients obtained from 3×Dy to 4×Dy can be less reliable than those obtained from '4×Dy+1' to '5×Dy−1' due to their closer proximity to the data capture symbol.

Finally, by comparison with the threshold, derived by observation and analysis, the decision can be made on the dynamicity of the channel. It should be noted that in FIG. 6 each rectangle box denotes 'Dy' symbols.

Zero Order Hold Imperfection in Dynamic Channel

In a dynamic channel, the frequency-axis extrapolation filters 802, 804, 806, 808 as described above with inputs derived from a zero order hold channel estimator can result in a time-shifted channel estimate depending on a Doppler shift present in the channel. Typically, the higher the Doppler the worse is the performance. This is due to the fact that the effect of frequency-axis extrapolation will result in the predicted channel estimate tracking the middle of the step response provided by the zero order hold channel estimate. Ideally, when viewed in time, the predicted channel estimate should track the outer edges of a rising slope and the inner edges of a falling slope in order to maintain good channel estimates in a dynamic channel.

Figure 17:
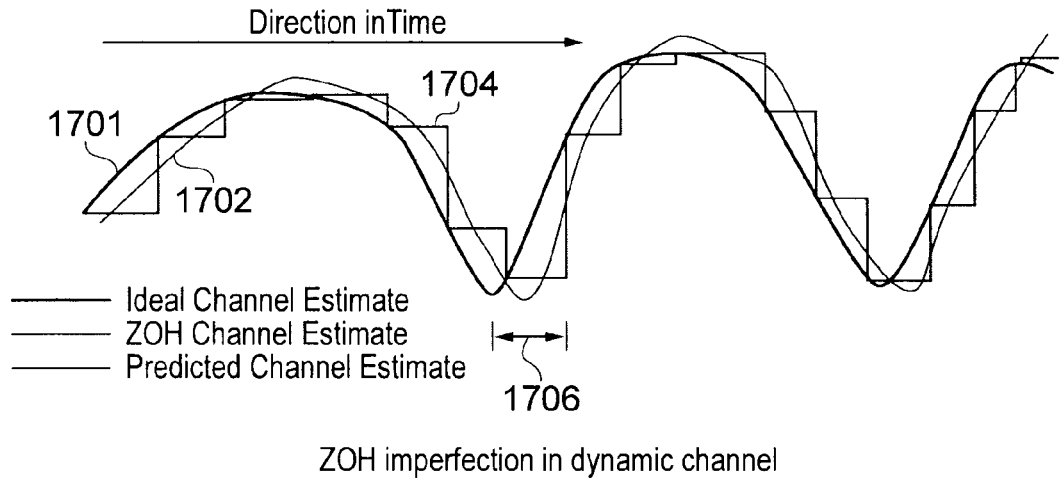
FIG. 17 is an illustration of a graphical representation illustrating the operation of the zero order hold technique for estimating a dynamically varying channel.

FIG. 17 provides an illustration of an effect of a delay in accurately estimating the channel estimate using a zero order hold channel estimator. As can be seen this illustrates a time shift between the channel estimate being developed depending on the Doppler frequency present in the channel.

In FIG. 17 a solid line 1701 illustrates the channel to be estimated whereas a thin line 1702 illustrates a predicted channel produced by tracking the values of the channel provided by the zero order hold estimate of the channel illustrated by the step value 1704. Thus the predicted channel estimate is calculated by determining an average predicted value produced from the zero order hold at channel estimate. As a result of which it can be seen that there is a relative delay illustrated by horizontal arrow 1706.

In order to address this delay caused by predicting the channel based on the zero order hold channel estimate, a time based linear extrapolation process is used which is performed by the linear extrapolator 706 shown in FIG. 7. This basically works on the simple mathematical equation of a line, which is $$y = mx + c$$

Where,
y=Output or pilot amplitude
m=Slope gradient
x=symbol index
c=Offset parameter The object of using a linear extrapolator instead of the zero-order-hold channel estimate is primarily to reduce the 'time-shifting' of the channel response at the output of the frequency-axis extrapolator in higher Doppler dynamic channels. The use of a linear extrapolator, due to its nature will result in a noisier channel estimate at the input of the frequency-axis extrapolator (CEPP) and so will require the extrapolator to work harder especially in low signal to noise ratio static channels. However the use of a time-dimensioned low pass filter can reduce the effect of this extra noise being added by the linear extrapolator.

Figure 18:
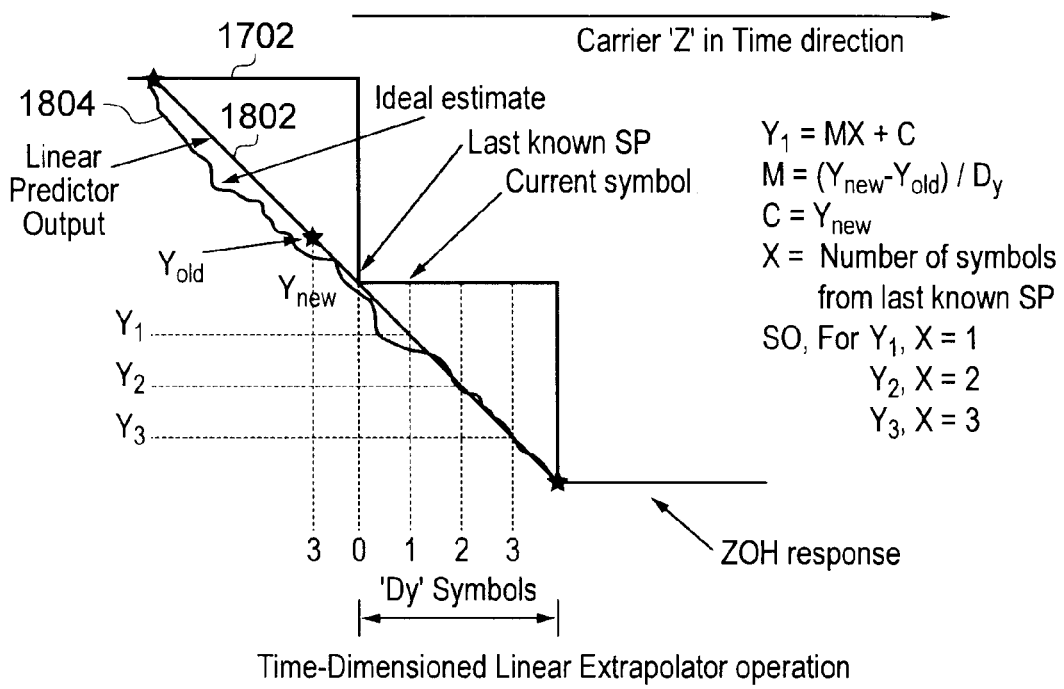
FIG. 18 is a graphical representation illustrating an operation of a time dimension linear extrapolator as used in an embodiment of the channel estimator shown in FIG. 7.

An analysis of the operation a linear extrapolator for a single carrier 'Z' in time is provided in FIG. 18, which shows the intended operation of the time-dimension linear extrapolator. As shown in FIG. 18 rather than predicting the average value from the zero order holder values, the linear extrapolator is used on the zero order hold values so as to reduce a delay caused by predicting the channel based on the zero order hold values alone. The operation of the linear extrapolator 706 is shown in FIG. 18. In FIG. 18 an example of the step values of the zero order hold plot 1702 shown in FIG. 17, is shown with a solid line 1802 being produced by using the linear extrapolator to apply a linear extrapolation in accordance with the above equation for a linear plot of y=mx+c. A third curving line 1804 illustrates an ideal estimate position of the channel. As can be seen, a delay between the estimate of the channel and that produced by the linear extrapolator has been substantially reduced.

The offset parameter (c) is defined as the value of the zero-order-hold output for carrier Z ($Y_{new}$). The slope gradient is defined as the difference between the zero-order-hold output for carrier Z ($Y_{new}$) and the value of the last linearly predicted value of carrier Z ($Y_{old}$), and is normalized by the 'Dy' parameter.

The symbol index is defined as the phase of the carrier Z in the current symbol, 0-in phase, 1-out of phase for one symbol, two out of phase for two symbols etc.

Figure 19:
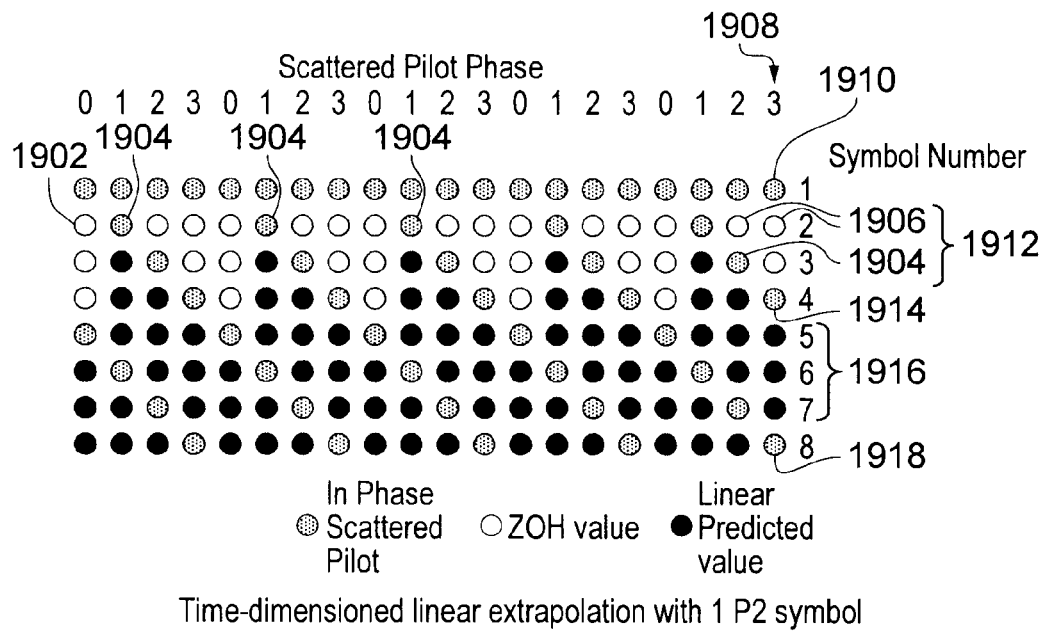
FIG. 19 is a graphical representation of pilot and data sub-carriers on a plurality of OFDM symbols illustrating a time dimension extrapolation with a DVB-T2 P2 symbol.

In the DVB-T and DVB-T2 systems, a repeating time divided frame of OFDM symbols is generated. A start of the frame includes a P2 symbol. A P2 symbol includes pilot carriers at every position throughout the OFDM symbol. As such, the linear predictor explained above can be started using the pilot carriers from the P2 symbols therefore increasing the accuracy of the estimate of the channel provided by the linear extrapolator. Thus as illustrated in FIG. 19 a first symbol 1901 represents a P2 symbol which has pilot symbols at every sub-carrier position. A next OFDM symbol 1902 will have scattered pilots present as shown by solid lines 1904 and no carriers at other positions which are therefore generated using a zero order hold of the previous pilot value which is illustrated by a light shaded position 1906. Further scattered sub-carrier pilots will be provided at positions throughout the subsequent OFDM symbols which vary as illustrated by positions 1904. However, once two pilots symbols are provided on any one sub-carrier, the linear prediction filter can operate as explained above to predict a value of the next channel sample at that sub-carrier position by linearly interoperating between the previous samples of the channel provided by the previous scattered pilots. Thus, as soon as the linear prediction has two samples of the channel, it can predict the next samples until a subsequent OFDM symbol provides a next pilot sub-carrier at that sub-carrier position. For example, at sub-carrier position 1908 a first OFDM symbol which is the P2 symbol provides a sub-carrier 1910 providing a pilot sample. A next two OFDM symbols do not have a pilot signal at that sub-carrier position and so the channel estimate is provided using a zero order hold value for symbols two and three 1912. Thereafter, the fourth OFDM symbol 1914 provides a pilot signal which can then be used for the next three OFDM symbols 1916 which are labelled some more numbers five, six and seven to predict the channel samples at these positions using the linear prediction technique explained above. Finally, at symbol number eight a further pilot signal is provided at that sub-carrier position 1918 which can be used to represent the channel at that point and subsequently be used in the linear prediction process to predict subsequent values.

It should be noted that for use in a DVB-T receiver, P2 symbols do not exist and so it is required to wait until 'Dy' symbols before linear extrapolation can begin, up until that point the zero-order-hold value would be used.

Edge Effect Mitigation

Due to imperfections within the receiver such as residual timing offsets, and changes in filter positioning during the filtering of the channel impulse response, the frequency axis extrapolation may suffer from degradation at the leading edge of a symbol. This degradation can also be caused by the shape of the tuner filter which typically rolls-off at the edges of the OFDM channel band.

In order to combat these degradations and bearing in mind that the time-based leaky bucket filter is in use for static channels, it is possible to retain the original (noisy) data for a given set of carriers at the edges of every symbol, this provides better channel estimates and helps to improve the performance.

Noise Power Estimation

An important part of the equalization process is to derive the noise power estimate in order for the channel state information (CSI) values to be computed. This calculation is done simply by subtracting the linear extrapolation output by the output of the frequency-dimensioned extrapolator (filtered output in the case of a static channel). This is shown in FIG. 20.

As explained above, it is important to generate channel state information in order to assist the error correction and decoding techniques and also to assist the equalization of the OFDM symbols received from the channel. FIG. 20 provides an example of a noise power estimation technique which can be used in combination with the linear prediction and post processing techniques explained above. The noise power estimation unit 714 therefore is illustrated in one example what is shown in FIG. 20.

Figure 20:
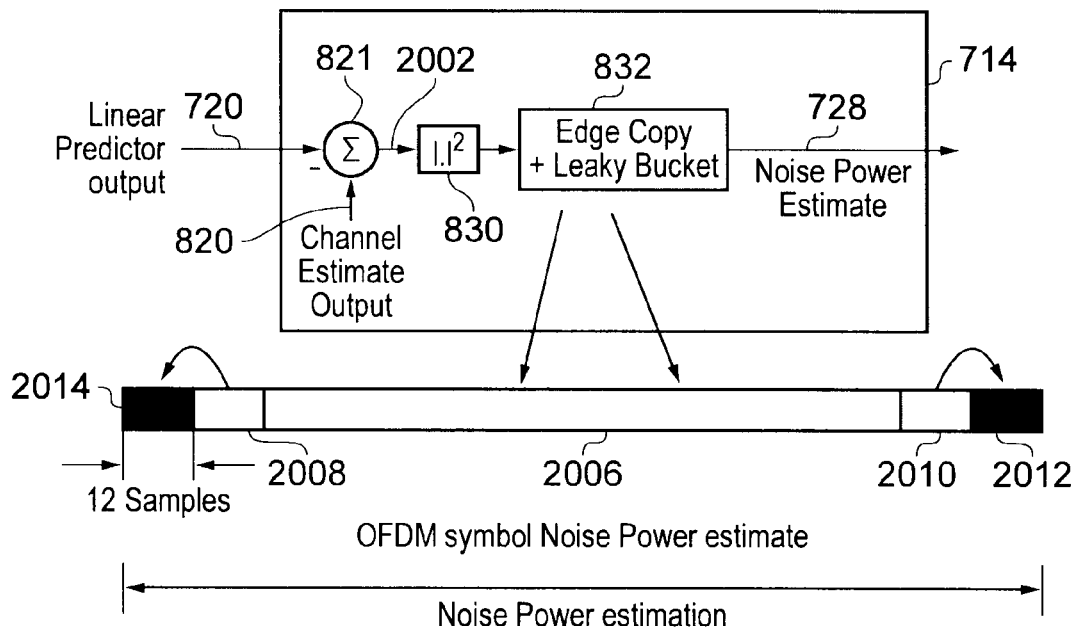
FIG. 20 is a part schematic part flow diagram representation illustrating a noise power estimation process performed within the channel estimator illustrated in FIG. 7.

As shown in FIG. 20 an output of the linear prediction filter is fed to the calculation circuit 821 and is used to subtract the output from the linear prediction processor 706 from an output of the channel estimate processor 820 to form an error signal at an output 2002. The magnitude forming circuit 830 is used to form magnitude of the error which is then fed to the edge copy and leaky bucket processor 832. As can be seen the edge copy and leaky bucket processor processes values of the noise power estimates from a main part of the OFDM symbol as represented by a box 2006. In order to ensure that there are enough samples to process the edge effects thereby mitigating that noise power estimate derived at the edges of the symbol will be artificially higher, symbol samples are copied from the useful part of the OFDM symbol 2006 in a region 2008, 2010 into a region shown by dark box 2012, 2014. As such, for example, as shown in FIG. 20, for example, twelve samples at the edges are copied from adjacent carriers. Thus in order to maintain a consistent level of noise power throughout the frequency band it is necessary to form this edge effect mitigation process in the noise power estimates. Thus the noise power is filtered in the time dimension using the leaky bucket filter 832 to provide a more consistent level of noise per estimates.

Various modifications may be made to the embodiments herein before described. For example it will be understood that the particular component parts of which the channel extrapolator described above is comprised, for example the linear interpolator, the NLMS filter and the channel estimator unit are logical designations. Accordingly, the functionality that these component parts provide may be manifested in ways that do not conform precisely to the forms described above and shown in the diagrams. For example aspects of the invention can be implemented in the form of a computer program product comprising instructions that may be implemented on a processor stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Embodiments of the present invention may also find application with other appropriate transmission standards such as the cable transmission standard known as DVB-C2. For the example of DVB-C2, it will be appreciated that the OFDM symbols are not transmitted and received via a radio frequency sub-carrier, but via cable and so an appropriate adaptation of the transmitter and receiver architecture can be made. However, it will be appreciated that the present invention is not limited to application with DVB and may be extended to other standards for transmission or reception, both fixed and mobile.

The invention claimed is:

1. A receiver for detecting and recovering data from Orthogonal Frequency Division Multiplexed (OFDM) symbols, the OFDM symbols comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, the receiver comprising a channel estimation processor which includes a pilot acquisition unit adapted to generate a sample of a channel transfer function for each pilot sub-carrier in a received OFDM symbol, and a channel estimator which is arranged to generate an estimate of the channel transfer function providing samples of the channel transfer function at each sub-carrier position in the received OFDM symbol from the pilot derived samples provided by the pilot acquisition unit, and a channel estimate post processor which is arranged in operation to process the estimate of the channel transfer function received from the channel estimation processor to generate a processed version of the channel transfer function, the channel estimate post processor including a controller, and a plurality of prediction filters, wherein the controller is arranged to filter the estimate of the channel transfer function produced by the channel estimation processor using the plurality of prediction filters to form the processed version of the channel transfer function to the effect of reducing noise in the processed version of the channel transfer function with respect to the estimate of the channel transfer function provided by the channel estimation processor.

2. A receiver as claimed in claim 1, wherein the plurality of prediction filters includes first and second prediction filters, each of the first and second prediction filters being arranged to receive contemporaneously the samples of the estimate of channel transfer function under the control of the controller and the controller is arranged to use the first and second prediction filters alternately so that the processed version of the channel transfer function is generated during a period when one of the first and second prediction filters is in a converged state.

3. A receiver as claimed in claim 1, wherein the plurality of prediction filters are formed into a first stage having a first of the prediction filters and a second stage having a second of the prediction filters, the first prediction filter of the first stage being arranged
  to receive the samples of the estimate of channel transfer function from the channel estimation processor,
  to generate a first version of the processed channel transfer function providing an estimate of the channel transfer function at each of the sub-carrier locations of the OFDM symbols, and
  the second prediction filter of the second stage being arranged
  to receive the samples of the first version of the processed channel transfer function from the first prediction filter, and
  to generate a second version of the processed channel transfer function providing an estimate of the channel transfer function at each of the sub-carrier locations of the OFDM symbols, the second version being processed to reduce noise which may be present in the first version of the channel transfer function with respect to the estimate of the channel transfer function provided by the channel estimation processor.

4. A receiver as claimed in claim 3, wherein the first stage includes the first prediction filter and a third prediction filter, the first and third prediction filters forming a first pair of prediction filters and the second stage includes the second prediction filter and a fourth prediction filter, the second and fourth prediction filters forming a second pair of prediction filters, and the controller is arranged in operation
  to arrange for each of the first and third prediction filters of the first stage filters to receive contemporaneously the samples of the estimate of channel transfer function from the channel estimation processor and to generate the first processed version of the channel transfer function, by selecting the output of the first or third prediction filters alternately to form the first processed version of the channel transfer function estimate during a period when one of the first and third prediction filters is in a converged state, and
  to arrange for each of the second and fourth prediction filters of the second stage filters to receive contemporaneously the samples of the first processed version of the channel transfer function and to generate the second processed version of the channel transfer function, by selecting the samples the output of the second and fourth prediction filters alternately to form the second processed version of the channel transfer function estimate during a period when one of the second and fourth prediction filters is in a converged state.

5. A receiver as claimed in claim 3, wherein each of the prediction filters in the first and second stages uses a different convergence co-efficient p.

6. A receiver as claimed in claim 1, wherein the channel estimate post processor includes
  an averaging filter adapted to filter the processed version of the channel transfer function estimate provided at the output of the plurality of prediction filters, and
  a filter controller arranged to receive pilot sub-carriers of the received OFDM symbols and to determine a relative measure of a rate of change of the channel transfer functions by comparing the pilot sub-carriers at the same positions in successive OFDM symbols and to control the effect of the averaging filter in proportion to the rate of change of the channel transfer function with the effect of reducing the averaging performed by the averaging filter for channel transfer functions which have a higher rates of change.

7. A receiver as claimed in claim 6, wherein the pilot sub-carriers compared by the filter controller are continuous pilots.

8. A receiver as claimed in claim 1, wherein the channel estimator includes
  a linear extrapolator which is adapted to receive the pilot position samples of the channel transfer function provided by the pilot data bearing sub-carriers of the OFDM symbols and to generate the samples of the channel transfer function for each of the sub-carriers in the received OFDM symbol by performing a linear extrapolation of the samples derived from the pilot bearing sub-carriers in the frequency domain.

9. A receiver as claimed in claim 1, comprising
  a noise power estimator adapted to generate an estimate of noise power at each of the samples of the received OFDM symbol in the frequency domain by comparing the samples of the estimate of the channel transfer function with the corresponding samples of the processed channel transfer estimate.

10. A receiver as claimed in claim 9, wherein the noise power samples within a predetermined number of samples from each edge of the OFDM symbol in the frequency domain are generated by copying the samples corresponding to that predetermined number from other samples with the OFDM symbol.

11. A method of detecting and recovering data from Orthogonal Frequency Division Multiplexed (OFDM) symbols, the OFDM symbols comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, the method comprising
  generating a sample of a channel transfer function for each pilot sub-carrier in a received OFDM symbol,
  generating an estimate of the channel transfer function providing samples of the channel transfer function at each sub-carrier position in the received OFDM symbol from the pilot derived samples, and processing the estimate of the channel transfer function to generate a processed version of the channel transfer function, the processing including filtering the estimate of the channel transfer function using a plurality of prediction filters to form the processed version of the channel transfer function to the effect of reducing noise in the processed version of the channel transfer function with respect to the estimate of the channel transfer function.

12. A method as claimed in claim 11, wherein the plurality of prediction filters includes first and second prediction filters, and the filtering includes arranging for each of the first and second prediction filters to receive contemporaneously the samples of the estimate of channel transfer function, and selecting the output from either the first or the second prediction filters alternately so that the processed version of the channel transfer function is generated during a period when one of the first and second prediction filters is in a converged state.

13. A method as claimed in claim 11, wherein the plurality of prediction filters are formed into a first stage having a first of the prediction filters and a second stage having a second of the prediction filters, the method including arranging for the samples of the estimate of channel transfer function to be received by the first prediction filter of the first stage to generate a first version of the processed channel transfer function, and arranging for the samples of the first processed version of the channel transfer function to be received by the second prediction filter of the second stage to generate a second version of the processed channel transfer function, the second version being processed to reduce noise which may be present in the first version of the channel transfer function with respect to the estimate of the channel transfer function provided by the channel estimation processor.

14. A method as claimed in claim 13, wherein the first stage includes the first prediction filter and a third prediction filter, the first and third prediction filters forming a first pair of prediction filters and the second stage includes the second prediction filter and a fourth prediction filter, the second and fourth prediction filters forming a second pair of prediction filters, and the filtering includes arranging for each of the first and third prediction filters of the first stage filters to receive contemporaneously the samples of the estimate of channel transfer function, selecting the output of the first or third prediction filters alternately to form the first processed version of the channel transfer function estimate during a period when one of the first and third prediction filters is in a converged state, arranging for each of the second and fourth prediction filters of the second stage filters to receive contemporaneously the samples of the first processed version of the channel transfer function, and selecting the output of the second and fourth prediction filters alternately to form the second processed version of the channel transfer function estimate during a period when one of the second and fourth prediction filters is in a converged state.

15. A method as claimed in claim 13, wherein each of the prediction filters in the first and second stages uses a different convergence co-efficient $\mu$.

16. A method as claimed in claim 11, the method includes receiving pilot sub-carriers of the received OFDM symbols, comparing the pilot sub-carriers at the same positions in successive OFDM symbols to determine a relative measure of a rate of change of the channel transfer function, filtering the processed version of the channel transfer function estimate provided at the output of the plurality of prediction filters with an averaging filter, and controlling the effect of the averaging filter in proportion to the rate of change of the channel transfer function with the effect of reducing the averaging performed by the averaging filter for channel transfer functions which have a higher rates of change.

17. A method as claimed in claim 16, wherein the pilot sub-carriers compared are continuous pilots.

18. A method as claimed in claim 11, wherein the generating an estimate of the channel transfer function includes filtering the pilot position samples of the channel transfer function provided by the pilot data bearing sub-carriers of the OFDM symbols with a linear extrapolator to generate the samples of the channel transfer function for each of the sub-carriers in the received OFDM symbol by performing a linear extrapolation of the samples derived from the pilot bearing sub-carriers in the frequency domain.

19. A method as claimed in claim 11, the method comprising generating an estimate of noise power at each of the samples of the received OFDM symbol in the frequency domain by comparing the samples of the estimate of the channel transfer function with the corresponding samples of the processed channel transfer estimate.

20. A method as claimed in claim 19, the method including generating noise power samples within a predetermined number of samples from each edge of the OFDM symbol in the frequency domain by copying the samples corresponding to that predetermined number from other samples with the OFDM symbol.

21. A non-transitory computer-readable medium including a computer program providing computer executable instructions which when loaded onto a computer causes the computer to perform the method according to claim 11.

22. A receiver comprising a detector for detecting Orthogonal Frequency Division Multiplexed (OFDM) symbols, the OFDM symbols comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, a channel estimation processor which includes a pilot acquisition unit adapted to generate a sample of the channel transfer function for each pilot sub-carrier in a received OFDM symbol, and a channel estimator which is arranged to generate an estimate of the channel transfer function providing samples of the channel transfer function at each sub-carrier position in the received OFDM symbol from the pilot derived samples provided by the pilot acquisition unit, and a channel estimate post processor which is arranged in operation to process the estimate of the channel transfer function received from the channel estimation processor to generate a processed version of the channel transfer function, the channel estimate post processor including a controller, and a plurality of prediction filters, wherein the controller is arranged to filter the estimate of the channel transfer function produced by the channel estimation processor using the plurality of prediction filters to form the processed version of the channel transfer function to the effect of reducing noise in the processed version of the channel transfer function with respect to the estimate of the channel transfer function provided by the channel estimation processor.

23. An apparatus for detecting and recovering data from Orthogonal Frequency Division Multiplexed (OFDM) symbols, the OFDM symbols comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, the apparatus comprising means for generating a sample of a channel transfer function for each pilot sub-carrier in a received OFDM symbol, means for generating an estimate of the channel transfer function providing samples of the channel transfer function at each sub-carrier position in the received OFDM symbol from the pilot derived samples, and means for processing the estimate of the channel transfer function to generate a processed version of the channel transfer function, the processing including means for filtering the estimate of the channel transfer function using a plurality of prediction filters to form the processed version of the channel transfer function to the effect of reducing noise in the processed version of the channel transfer function with respect to the estimate of the channel transfer function.

\* \* \* \* \*